(12) United States Patent
Hosek

(10) Patent No.: US 9,222,804 B2
(45) Date of Patent: Dec. 29, 2015

(54) SYSTEM AND METHOD FOR POSITION SENSING

(75) Inventor: Martin Hosek, Lowell, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 482 days.

(21) Appl. No.: 13/599,930

(22) Filed: Aug. 30, 2012

(65) Prior Publication Data

US 2013/0057263 A1    Mar. 7, 2013

Related U.S. Application Data

(60) Provisional application No. 61/573,279, filed on Sep. 2, 2011.

(51) Int. Cl.
*G01B 7/14* (2006.01)
*G01D 5/22* (2006.01)

(52) U.S. Cl.
CPC .................................... *G01D 5/2266* (2013.01)

(58) Field of Classification Search
CPC .................................... G01B 7/30; G01B 7/14
USPC ..................................................... 324/207.18
See application file for complete search history.

(56) References Cited

U.S. PATENT DOCUMENTS

| | | |
|---|---|---|
| 2,632,058 A | 3/1953 | Gray |
| 3,820,110 A | 6/1974 | Henrich et al. |
| 4,951,048 A * | 8/1990 | Ichikawa et al. .................. 341/15 |
| 6,611,138 B2 * | 8/2003 | Vasiloiu .................... 324/207.12 |
| 6,617,712 B1 | 9/2003 | Dondi |
| 7,129,984 B1 | 10/2006 | Osada et al. |
| 7,199,727 B2 | 4/2007 | Gondoh |
| 2003/0141917 A1 | 7/2003 | McBrien |
| 2005/0270040 A1 | 12/2005 | Stridsberg |
| 2008/0028423 A1 | 1/2008 | Woo |
| 2008/0174302 A1 | 7/2008 | Lee et al. |
| 2008/0223942 A1 | 9/2008 | Ishii et al. |
| 2009/0015248 A1 | 1/2009 | Moura et al. |
| 2009/0033316 A1 | 2/2009 | Hosek et al. |
| 2009/0243413 A1 | 10/2009 | Gilchrist et al. |
| 2010/0213358 A1 | 8/2010 | Chang |

OTHER PUBLICATIONS

Written Opinion of the International Searching Authority for International Application No. PCT/US2012/000376, Nov. 16, 2012, 7 pgs. (unnumbered).

(Continued)

*Primary Examiner* — Bot Ledynh
(74) *Attorney, Agent, or Firm* — Iandiorio Teska & Coleman, LLP

(57) ABSTRACT

A system for position sensing includes an incremental track including a plurality of sectors and a measurement subsystem. The measurement subsystem includes at least two differential read-heads each having at least one primary coil and at least two differential secondary coils, the at least two differential secondary coils of one of the at least two differential read-heads configured to generate output signals having their amplitudes modulated by the sectors of the incremental track and the at least two differential secondary coils of the other of said two differential read-heads configured to generate output signals having their amplitudes modulated by the sectors of the incremental track.

13 Claims, 17 Drawing Sheets

(56) References Cited

OTHER PUBLICATIONS

K. Ara, "A Differential Transformer With Temperature-and Excitation-Independent Output", IEEE Transactions on Instrumentation and Measurement, vol. 1M-21, No. 3, Aug. 1972, pp. 249-255.

Armani et al., "Design of a High-Reliability 20-Bit Optical Shaft Encoder", IEEE, 2008, 4 pgs. (unnumbered).

Chiriac et al., "Linear variable differential transformer sensor using Fe-rich amorphous wires as an active core", Journal of Applied Physics, vol. 87, No. 9, May 1, 2000, pp. 5344-5346.

Tuvi Etzion and Kenneth G. Paterson, "Near Optical Single-Track Gray Codes", IEEE Transactions on Information Theory, vol. 42, No. 3, May 1996, pp. 779-789.

Hammond et al., "Electronic Components and Circuits for Extreme Temperature Environments", IEEE, ICBCS-2003, pp. 44-47.

Kimura et al., "Capacitive-Type Flexible Linear Encoder With Untethered Slider Using Electrostatic Induction", IEEE Sensors Journal, vol. 10, No. 5, May 2010, pp. 972-978.

Bruno Lequesne, "High-Accuracy Magnetic Position Encoder Concept", IEEE Transactions on Industry Applications, vol. 35, No. 3, May/Jun. 1999, pp. 568-576.

Liu et al., "A Novel Absolute Magnetic Encoder based on Pseudo-random Code", Proc. of the 2009 IEEE International Conference on Information and Automation, Jun. 22-25, 2009, Zhuhai/Macau, China, pp. 385-390.

Martino et al., "Design of a Linear Variable Differential Transformer With High Rejection to External Interfering Magnetic Field", IEEE Transactions on Magnetics, vol. 46, No. 2, Feb. 2010, pp. 674-677.

Donald K. Mitchell, "A Radiation-Hardened, High-Resolution Optical Encoder for Use in Aerospace Applications", IEEE Xplore, 2008, pp. 1-7.

Xiren Yan and Qiyi Wang, "Coding of shared Track Gray Encoder", Journal of Dynamic Systems, Measurement, and Control, vol. 122, Sep. 2000, pp. 573-576.

Patterson et al., "Electronics for deep space cryogenic applications", J. Phys. IV France 12 (2002), pp. 207-210.

\* cited by examiner

| Angle (deg) 122 | S1 100 | S2 102 | S3 104 | S4 106 | S5 108 | Angle (deg) 122 | S1 100 | S2 102 | S3 104 | S4 106 | S5 108 |
|---|---|---|---|---|---|---|---|---|---|---|---|
| 0 | 0 | 0 | 1 | 0 | 1 | 180 | 1 | 1 | 1 | 0 | 0 |
| 12 | 0 | 0 | 0 | 0 | 1 | 192 | 1 | 1 | 1 | 0 | 1 |
| 24 | 0 | 0 | 0 | 1 | 1 | 204 | 0 | 1 | 0 | 1 | 1 |
| 36 | 0 | 0 | 1 | 1 | 1 | 216 | 0 | 1 | 0 | 0 | 1 |
| 48 | 0 | 1 | 1 | 1 | 1 | 228 | 0 | 1 | 0 | 0 | 0 |
| 60 | 0 | 1 | 0 | 1 | 1 | 240 | 1 | 1 | 0 | 0 | 0 |
| 72 | 0 | 1 | 0 | 1 | 0 | 252 | 1 | 1 | 0 | 0 | 1 |
| 84 | 0 | 0 | 0 | 1 | 0 | 264 | 1 | 1 | 0 | 1 | 1 |
| 96 | 0 | 0 | 1 | 1 | 0 | 276 | 1 | 1 | 0 | 1 | 0 |
| 108 | 0 | 1 | 1 | 1 | 0 | 288 | 1 | 0 | 0 | 1 | 0 |
| 120 | 1 | 1 | 1 | 1 | 0 | 300 | 1 | 0 | 0 | 0 | 0 |
| 132 | 1 | 0 | 1 | 1 | 0 | 312 | 1 | 0 | 0 | 0 | 1 |
| 144 | 1 | 0 | 1 | 0 | 0 | 324 | 1 | 0 | 0 | 1 | 1 |
| 156 | 0 | 0 | 1 | 0 | 0 | 336 | 1 | 0 | 1 | 1 | 1 |
| 168 | 0 | 1 | 1 | 0 | 0 | 348 | 1 | 0 | 1 | 0 | 1 |

SYSTEM AND METHOD FOR POSITION SENSING

RELATED APPLICATIONS

This application claims benefit of and priority to U.S. Provisional Application Ser. No. 61/573,279 filed Sep. 2, 2011 under 35 U.S.C. §§119, 120, 363, 365, and 37 C.F.R. §1.55 and §1.78 and incorporated herein by this reference.

FIELD OF THE INVENTION

This invention relates to a system and method for position sensing.

BACKGROUND OF THE INVENTION

Rovers, cranes, robots and other equipment for in-situ resource utilization, site scouting and surface robotic exploration on lunar surface, moons and asteroids may require position encoders that operate in extreme environments, accommodate a broad temperature range, and tolerate hard vacuum and abrasive dust. Overlapping requirements, including vacuum compatibility and reliable operation in harsh environments, may be seen in demanding industrial applications, such as in the manufacturing processes for semiconductor devices.

Optical encoders are one of the most popular conventional solutions for precision motion control applications. A typical conventional rotary optical encoder includes a glass or plastic disk with transparent and opaque areas, a light source and a photo detector array (read-head) that detects the optical pattern resulting from the position of the disk. Recent technical developments have focused primarily on performance improvements, miniaturization, efficient coding patterns and cost reduction. See, e.g., U.S. Pub. No. 2010/0213358, incorporated by reference herein. Due to their principle of operation and a relatively small size of the features on the disk, conventional optical encoders may be sensitive to contamination, e.g., dust, dirt, and the like. Although vacuum compatible solutions may exist, the read-head and, in some applications, the attachment method of the disk to the shaft represent out-gassing problems and may lead to considerable limitations in environments with aggressive residual gases.

Conventional magnetic encoders, which typically include a magnetic wheel and a magnetoresistive or Hall-effect sensor module, may not be sensitive to dust and dirt and may offer a rugged alternative to optical encoders in harsh environments. Recent research has been focused on improved accuracy and resolution while preserving the ruggedness of the magnetic solution. See e.g., Lequesne et al., "*High-Accuracy Magnetic Position Encoder Concept*", IEEE Transactions on Industry Applications, Vol. 35, No. 3, May/June 1999, pp. 568-576, incorporated by reference herein. Conventional magnetic encodes typically provide a limited measurement resolution and may be sensitive to temperature effects.

Conventional capacitive linear encoders typically function by sensing the capacitance between a reader and scale. Some of the most recent research efforts have been focused on linear flexible solutions with a non tethered slider where electrostatic induction is utilized to eliminate cabling to the moving part of the system. See e.g., U.S. Pat. No. 7,199,727, and Kimura et al., "*Capacitive-Type Flexible Linear Encoder with Untethered Slider Using Electrostatic Induction*", IEEE Sensors Journal, Vol. 10, No. 5, May 2010, pp. 972-978, both incorporated by reference herein. Capacitive encoders may be insensitive to external magnetic fields but may be affected by temperature, humidity and condensation, and foreign matter.

Conventional inductive encoders rely on principle that the inductance of one or more coils changes in relation to the material sensed, e.g., a semi-circular iron core. The drawbacks to inductive encoders may include the temperature dependence of the soft iron. Therefore, highly accurate inductive encoders do not include iron and the contrast is generated with eddy currents. See e.g., U.S. Pat. No. 3,820,110, incorporated by reference herein.

All of the conventional encoder technologies discussed above utilize cyclical patterns on a moving section of the system and may provide an incremental position measurement based on the number of cycles counted. In order to determine the absolute position of the moving section of the system, either at start-up or periodically/on-demand during operation, additional information needs to be coded and sensed.

In a majority of commercial products, multiple tracks on a complex disk or scale are utilized to hold information for absolute position detection with each track providing the state of one bit of a digital word that represents the corresponding absolute location. Typically, a Gray-type code is utilized to ensure that only single-bit transitions occur as the disk or scale moves. See e.g., U.S. Pat. No. 2,632,058, incorporated by reference herein.

It has been shown that a single measurement track can be utilized for absolute position detection. See e.g., Yan et al., "*Coding of Shared Track Gray Encoder*", Journal of Dynamic Systems, Measurement, and Control, Vol. 122, September 2000, pp. 573-576, incorporated by reference herein. As disclosed therein, the track includes a pattern of non-uniform sectors that are detected by a set of sensors distributed along the track, each sensor representing one bit of the absolute position word. In order to achieve consistent transitions during motion, the arrangement needs to follow a Gray-type pattern, i.e., only one sensor can change state at a time.

A conventional resolver is a type of rotary electrical transformer. In a brushless configuration, a primary winding, fixed to the stator, is excited by a sinusoidal electric current, which induces current in the rotor regardless of its relative angular position. The current then flows through another winding in the rotor, in turn inducing current in a pair of secondary windings, which are configured at 90° from each other in the stator, to produce sine and cosine output signals. The relative magnitudes of the outputs are used to determine the angle of the rotor with respect to the stator. Conventional resolvers typically suffer from a limited resolution. This may be overcome with an increased number of poles. Increasing the number of poles results in higher complexity and may be difficult to adapt to applications with a broad range of operating temperatures.

Conventional linear and rotary variable differential transformers typically utilize three coils (a central primary coil and two outer secondary coils) and a ferromagnetic core attached to the object the position of which is to be measured. Alternating current is driven through the primary coil, causing a voltage dependent on the position of the core to be induced in each secondary coil. If the secondary coils are connected in reverse series, so that the resulting output voltage is the difference between the two secondary voltages, the amplitude of the output signal is proportional to the position of the core.

In a ratiometric arrangement, where the individual output signals from the two secondary windings are compared to their sum and by utilizing the sum of the signals as a reference input for feedback control of the AC excitation, the sensor offers an exceptional level of tolerance to temperature variations. See e.g., Ara K., "*A Differential Transformer with Temperature-and Excitation-Independent Output*", IEEE Transactions on Instrumentation and Measurement, Vol. IM-21, No. 3, August 1972, pp. 249-255, incorporated by reference herein. If properly designed, the sensor may also be insensitive to external electromagnetic interferences. See e.g., Martino et al., "*Design of a Linear Variable Differential Transformer with High Rejection to External Interfering Magnetic Field*", IEEE Transactions on Magnetics, Vol. 46, No. 2, February 2010, pp. 674-677, incorporated by reference herein. Taking advantage of Fe-rich amorphous wires for the core, a small exciting field and a small number of windings in the secondary coils may be necessary to obtain a large output signal. See e.g., Hristoforou et al. "*Linear Variable Differential Transformer Sensor Using Fe-Rich Amorphous Wires as an Active Core*", Journal of Applied Physics, Vol. 87, No. 9, May 2000, incorporated by reference herein. One main drawback of LVDT's and RVDT's may be a limited range of motion.

A high-resolution multidimensional position encoder that simultaneously measures positions of an object in plane and senses distance of the object in the perpendicular direction was described in U.S. Pub. No. 2009/0224750, incorporated by reference herein. As disclosed therein, the encoder utilizes Hall-effect read-heads to sense a three-dimensional magnetic field produced by an array of permanent magnets that are embedded in a forcer of a planar electric motor.

Extending the same principles to a rotary maglev application, a high-resolution encoder for simultaneous measurements of an angular orientation and eccentricity of a motor rotor was developed. In this case, Hall-effect read-heads sense a two-dimensional magnetic field from the permanent-magnet rotor and also detect features on a secondary track to determine the absolute angle of the rotor. See e.g., U.S. Pub. No. 2009/024313, incorporated by reference herein. Since a separation barrier can be used to isolate the read-heads from the rotor, this approach is suitable for vacuum applications. However, the presence of the magnets in a potentially aggressive environment and a limited operating temperature range disqualify this technology from the extreme applications under consideration.

A concept of a high-resolution two-dimensional encoder that measures simultaneously linear position and gap of a passive magnetically levitated cart was described in U.S. Pub. No. 2009/0033316, incorporated by reference herein. The encoder is based on a series of variable differential transformers, which are located along the motion path of the cart to sense a single ferromagnetic element coupled to the cart. In some respects, this approach can be viewed as an inverted version of the present concept. However, it is considerably more complex due to the specific requirements of the target maglev application.

A prominent place among the technical challenges in the subject application belongs to environmental effects, as the proposed system for position sensing needs to operate in vacuum and under extreme temperatures.

BRIEF SUMMARY OF THE INVENTION

In one aspect, a system for position sensing is featured. The system includes an incremental track including a plurality of sectors, and a measurement subsystem, the measurement subsystem includes: at least two differential read-heads each having at least one primary coil and at least two differential secondary coils, the at least two differential secondary coils of one of the at least two differential read-heads configured to generate output signals having their amplitudes modulated by the sectors of the incremental track and the at least two differential secondary coils of the other of said two differential read-heads configured to generate output signals having their amplitudes modulated by the sectors of the incremental track.

In one embodiment, the measurement subsystem may comprise a device configured to determine the amplitudes of each of output signals having their amplitudes modulated by the sectors of the incremental track, determine substantially sinusoidal signals and substantially cosine signals with respect to a position of the sectors of the incremental track, and determine the position of the track using the substantially sinusoidal signals and the substantially cosine signals. The differential secondary coils of each of the two differential read heads may be connected in reverse series. The differential secondary coils of each of the two differential read heads may be independently connected to the device. The device may be configured to determine the angular position of the track independent of the amplitudes of the output signals. The differential read-heads may be configured to determine the position irrespective of a change in a predetermined condition. The system may include an absolute track having a pattern of non-uniform sections, the absolute track coupled to the incremental track, the plurality of sensors configured to determine the position by detecting transitions of the non-uniform sections. The system may include a barrier between the incremental track and the measurement subsystem, the barrier configured to isolate said measurement subsystem from an external environment.

In another aspect, the system for position sensing is featured. The system includes an incremental track including a plurality of sectors and a measurement subsystem. The measurement subsystem includes at least two differential read-heads each having at least one primary coil and at least two secondary coils, the at least two secondary coils of one of the at least two differential read-heads configured to generate output signals having substantially sinusoidal signed amplitudes based on a differential measurement between the secondary coils with respect to a position of the incremental track and the at least two secondary coils of the other of said two differential read-heads configured to generate output signals having substantially cosine signed amplitudes based on a differential measurement between the secondary coils with respect to the position of the track.

In another embodiment, the measurement subsystem may include a device configured to determine substantially sinusoidal signals and substantially cosine signals based on the output signals having substantially sinusoidal signed amplitudes and the output signals having substantially cosine signed amplitudes and configured to determine the position of the track using the substantially sinusoidal signals and the substantially cosine signals. The secondary coils of each of the two differential read heads may be connected in reverse series. The secondary coils of each of the two differential read heads may be independently connected to the device. The device may be configured to determine the angular position of the track independent of the amplitudes of the output signals having substantially sinusoidal signed amplitudes and the output signals having substantially cosine signed amplitudes. The differential read-heads may be configured to determine the position irrespective of a change in a predetermined condition. The system may include an absolute track having a pattern of non-uniform sections, the absolute track coupled to the incremental track, the plurality of sensors configured to determine the position by detecting transitions of the non-uniform sections. The system may include a barrier between the incremental track and the measurement subsystem, the barrier configured to isolate said measurement subsystem from an external environment.

In another aspect, a method for position sensing is featured. The method includes providing an incremental track including a plurality of sectors, providing at least two differential read heads, each having at least one primary coil and at least two differential secondary coils, generating output signals having their amplitudes modulated by the sectors of the incremental track by the at least two differential secondary coils of one of the at least two differential read heads, and generating output signals having their amplitudes modulated by the sectors of the incremental track by the other of said two differential read heads.

In one embodiment, the method may include determining the amplitudes of each of the output signals having their amplitudes modulated by sectors of the incremental track, determining substantially sinusoidal signals and substantially cosine signals with respect to a position of the sectors of the incremental track, and determining the position of the track using the substantially sinusoidal signals and the substantially cosine signals. The method may include connecting the differential secondary coils of each of the two differential read heads in reverse series. The method may include independently connecting each of the two differential read heads of the differential secondary coils of each of the two differential read heads to a device.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 15 depicts an example of a Gray pattern generated by the position sensor subsystem shown in FIG. 14;

DETAILED DESCRIPTION OF THE INVENTION

Figure 1:
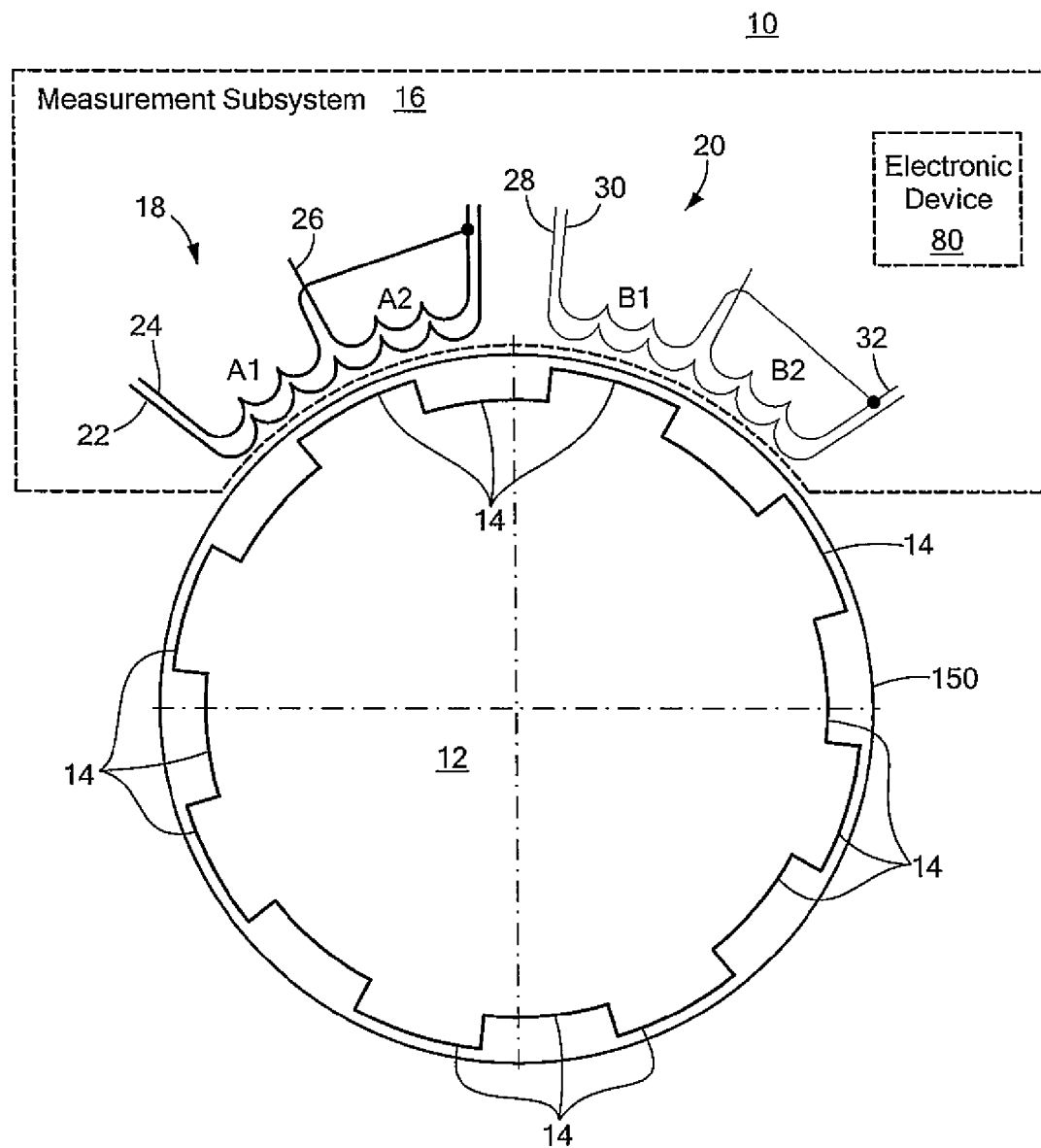
FIG. 1 is a schematic block diagram showing the primary components of one embodiment of the system and method for position sensing of this invention.

Aside from the disclosed embodiment or embodiments below, the disclosed embodiment or embodiments are capable of other embodiments and of being practiced or being carried out in various ways. Thus, it is to be understood that the disclosed embodiment or embodiments are not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of system 10 and the method thereof for position sensing. System 10 includes incremental track 12 including a plurality of sectors 14. System 10 also includes measurement subsystem 16 which includes at least two differential read-heads 18 and 20. In one example, differential read-head 18 includes at least one primary coil 22 and secondary coils 24 and 26 and differential read-head 20 includes at least one primary coil 22 and secondary coils 30 and 32. In one example, secondary coils 24 and 26 and secondary coils 24 and 26 are preferably connected in reverse series as shown. One of differential read-heads 18 and 20 may be configured to generate output signals having substantially sinusoidal signed amplitudes based on a differential measurement between the secondary coils thereof with respect to the position of incremental track 12 and the other differential read-head 18 and 20 may be configured to generate output signals having substantially cosine signed amplitudes based on a differential measurement between the secondary coils thereof with respect to the position of the track.

Measurement subsystem 16 may also include device 80, e.g., an electronic or similar type device, which calculates substantially sinusoidal signals and substantially cosine signals based on the output signals having substantially sinusoidal signed amplitudes and the output signals having substantially cosine signed amplitudes to determine the position of incremental track 12 using the substantially sinusoidal signals and the substantially cosine signals.

Device 80 preferably energizes the primary coil 22 of differential read-head 18 and primary coil 28 of differential read-head 20 with an AC supply at a desired frequency and amplitude. This produces an alternating magnetic field and induces signals into secondary coils 24 and 26 of differential read-head 18 and secondary coils 30 and 32 of differential read-head 20 which may be dependent on the position of incremental track 12.

Figure 2:
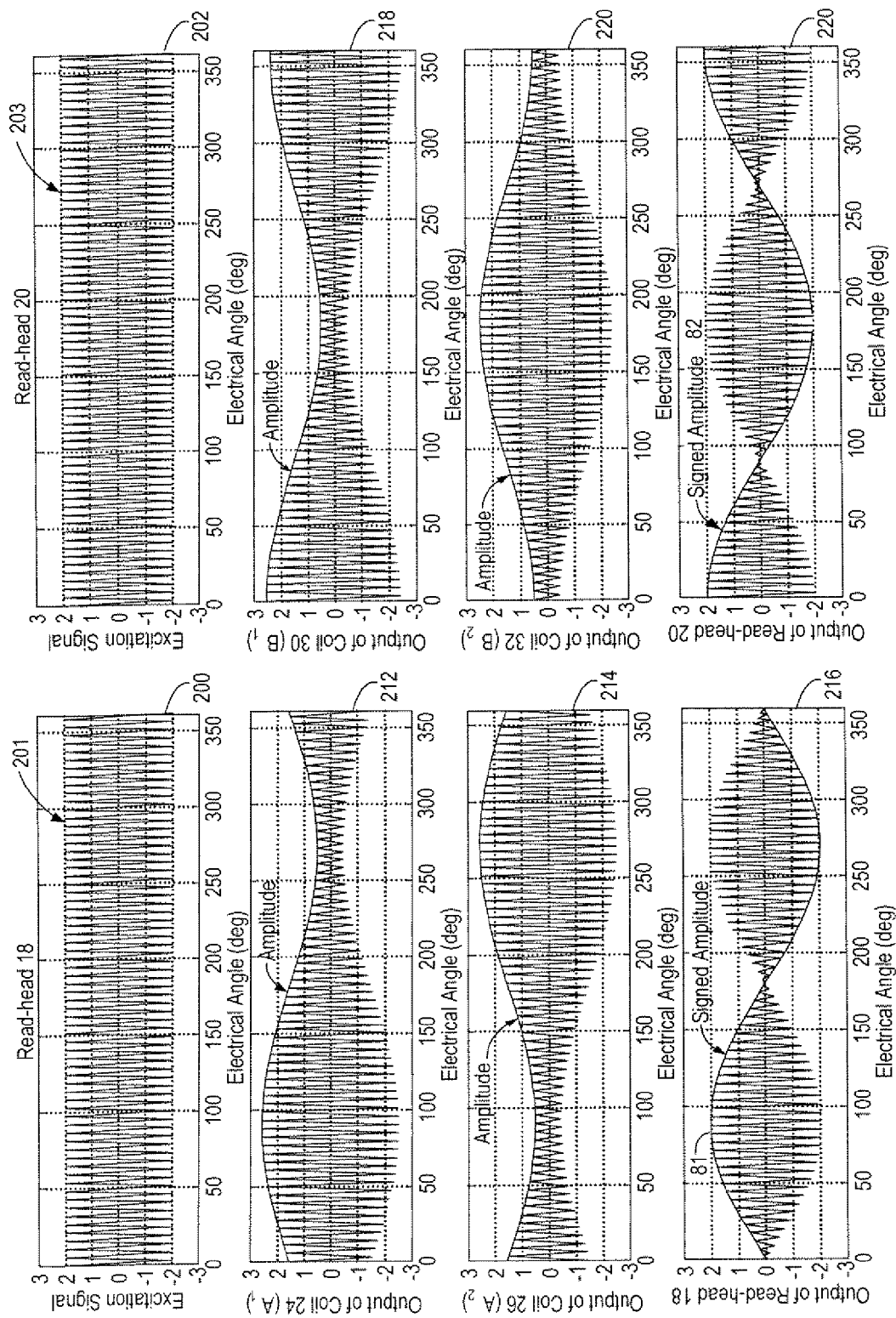
FIG. 2 depicts examples of plots of signals output by the differential reads shown in FIG. 1 and plots of the substantially sinusoidal signals and the substantially cosine signals are generated accordance with one embodiment of this invention.

For example, plot 200, FIG. 2, shows an example of excitation signals 201 applied to differential read-head 18 and plot 202 shows an example of example of excitation signals 203 applied to differential read-head 20. Plot 212 shows an example of the output signals of secondary coil 24 of differential read-head 18 and plot 214 shows an example of the output signals of secondary coil 26 of differential read-head 18. Similarly, plot 218 shows an example of the output signals secondary coil 28 of differential read-head 20 and plot 220 shows an example of the output signals of secondary coil 28 of differential read-head 18.

In this example, where secondary coils 24 and 26 of differential read-head 18 are connected in reverse series, differential read-head 18 subtracts the signals shown plot 214 from the signals shown in plot 212 to generate the output signals shown in plot 216 having substantially sinusoidal signed amplitudes. Similarly, differential read-head 20 subtracts the signals shown plot 220 from the signals shown in plot 218 to generate the output signals shown in plot 220 having substantially cosine signed amplitudes.

Device 80, FIG. 1, then preferably calculates substantially sinusoidal signals 81, FIG. 2, and substantially cosine signals 82 based on the output signals having substantially sinusoidal signed amplitudes shown in plot 216 and the output signals having substantially cosine signed amplitudes shown in plot 220, respectively. Using substantially sinusoidal signals 81 and substantially cosine signals 82, electronic device 80 determines the position of incremental track 12, FIG. 1.

Figure 3:
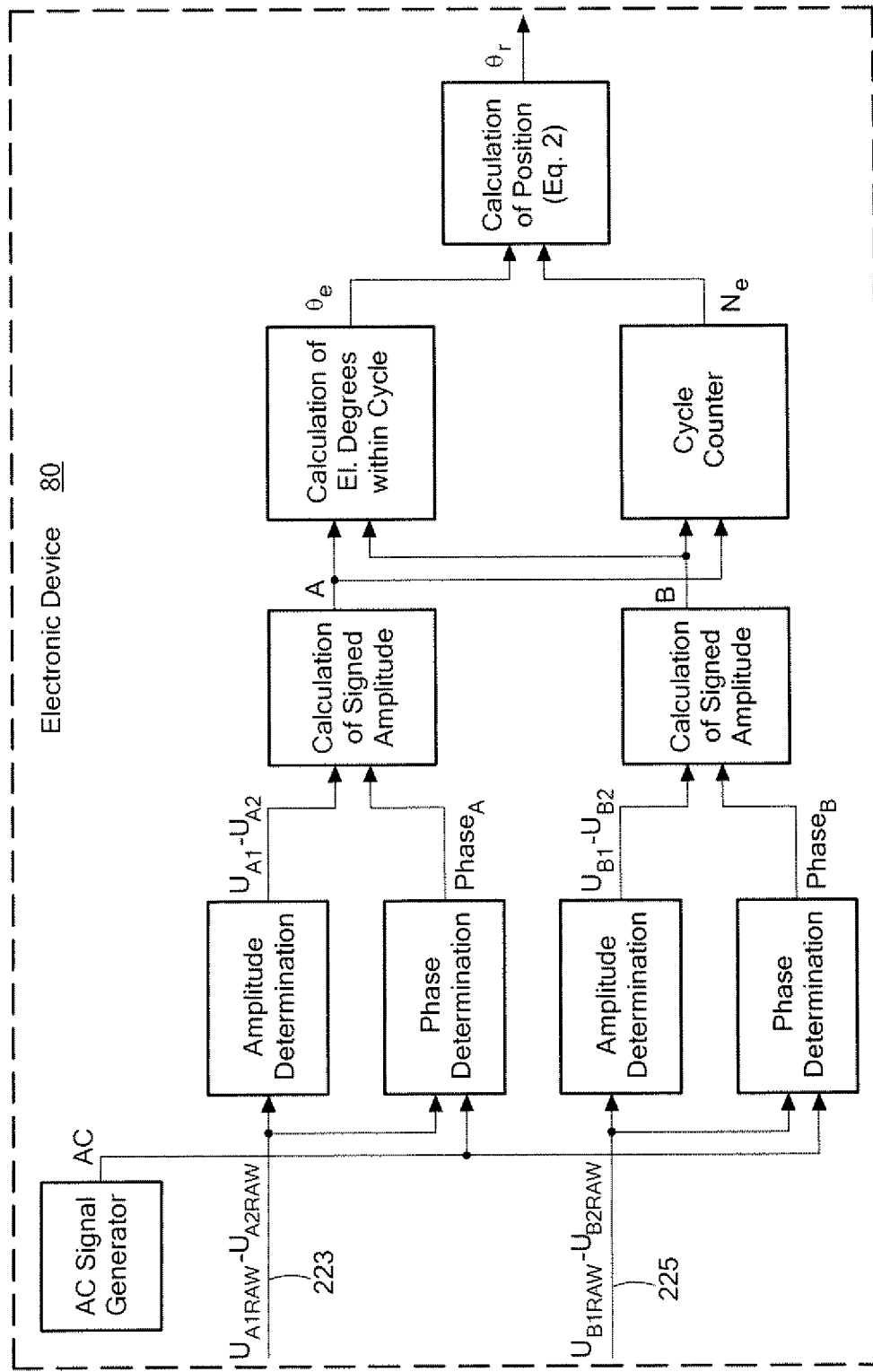
FIG. 3 is a schematic block diagram showing in further detail the primary components and operation of one embodiment of the system and method shown in FIG. 1.

FIG. 3 shows in further detail the primary components of one embodiment of device 80. In this example, UA1RAW-UA2RAW, indicated at 223 is the output of differential read-head 18 shown in plot 216, FIG. 2, which is a signal with substantially sinusoidal signed amplitude. UB1RAW-UB2RAW, indicated at 225, FIG. 3, is the output of differential read-head 20 shown in plot 220, FIG. 2 which is a signal with substantially cosine signed amplitude. Electronic device 80, FIG. 3, then calculates substantially sinusoidal signals 81, FIG. 2, and substantially cosine signals 82 based on the output signals having substantially sinusoidal signed amplitudes shown in plot 216 and the output signals having substantially cosine signed amplitudes shown in plot 220. Device 80 then determines the position of incremental track 12, FIG. 1, using substantially sinusoidal signals 81 and substantially cosine signals 82.

Figure 4:
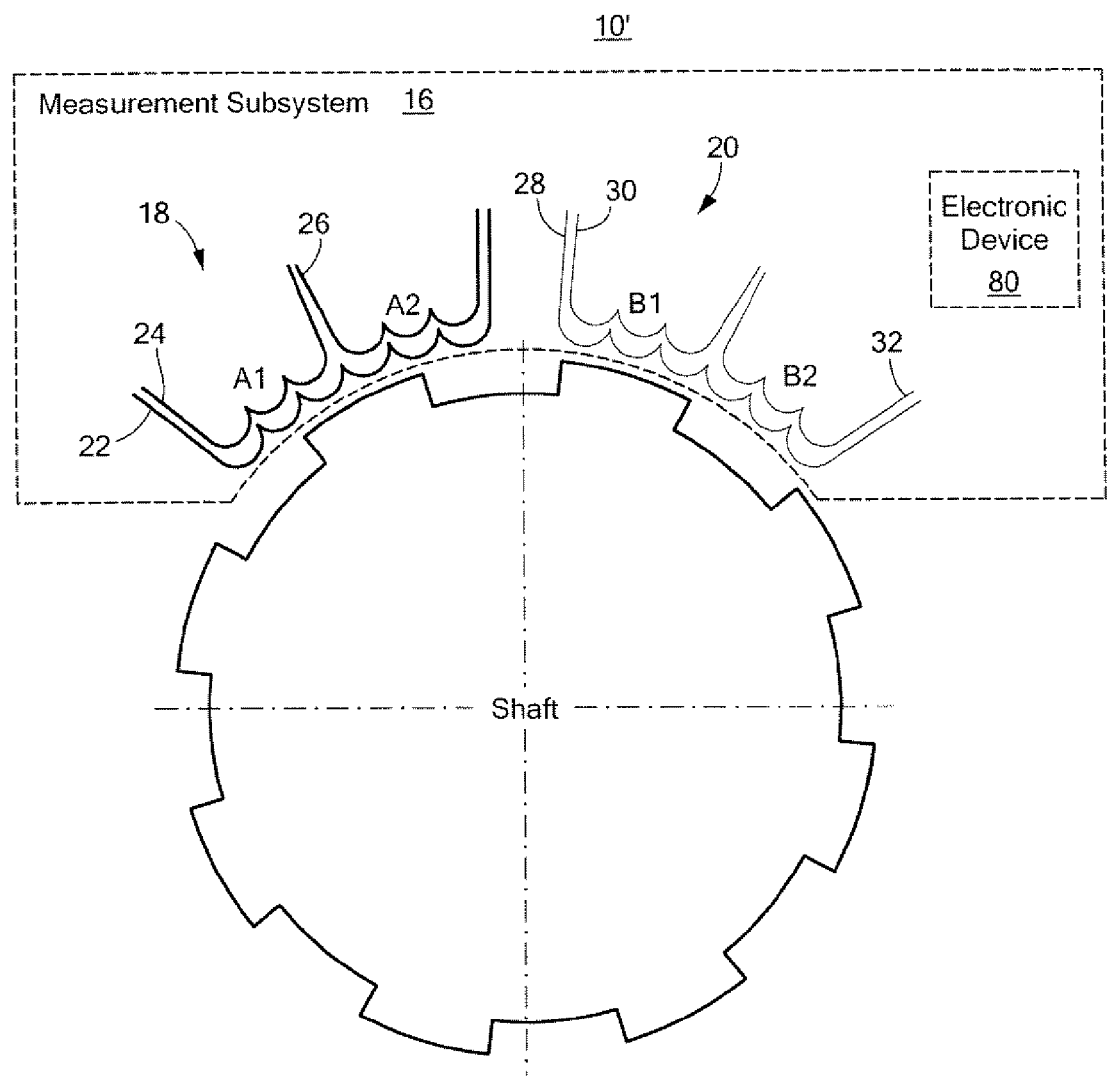
FIG. 4 is a schematic block diagram showing the primary components of another embodiment of the system and method for position sensing of this invention.

In another embodiment, system 10', FIG. 4, where like parts have like numbers, secondary coils 24 and 26 and secondary coils 30 and 32 of differential read 18 and differential read 20, respectively are not connected in reverse series but instead are independently connected to device 80. In this example, each of secondary coils 24 and 26 of differential read-head 18 generate output signals having their amplitudes modulated by the sectors of the incremental track, e.g., the signals shown in plots 212 and 214, FIG. 2. Similarly, each of secondary coils 30 and 32 of differential read-head 20 generate output signals having their amplitudes modulated by the sectors of the incremental track, e.g., the signals shown in plots 218 and 220, FIG. 2.

Figure 5:
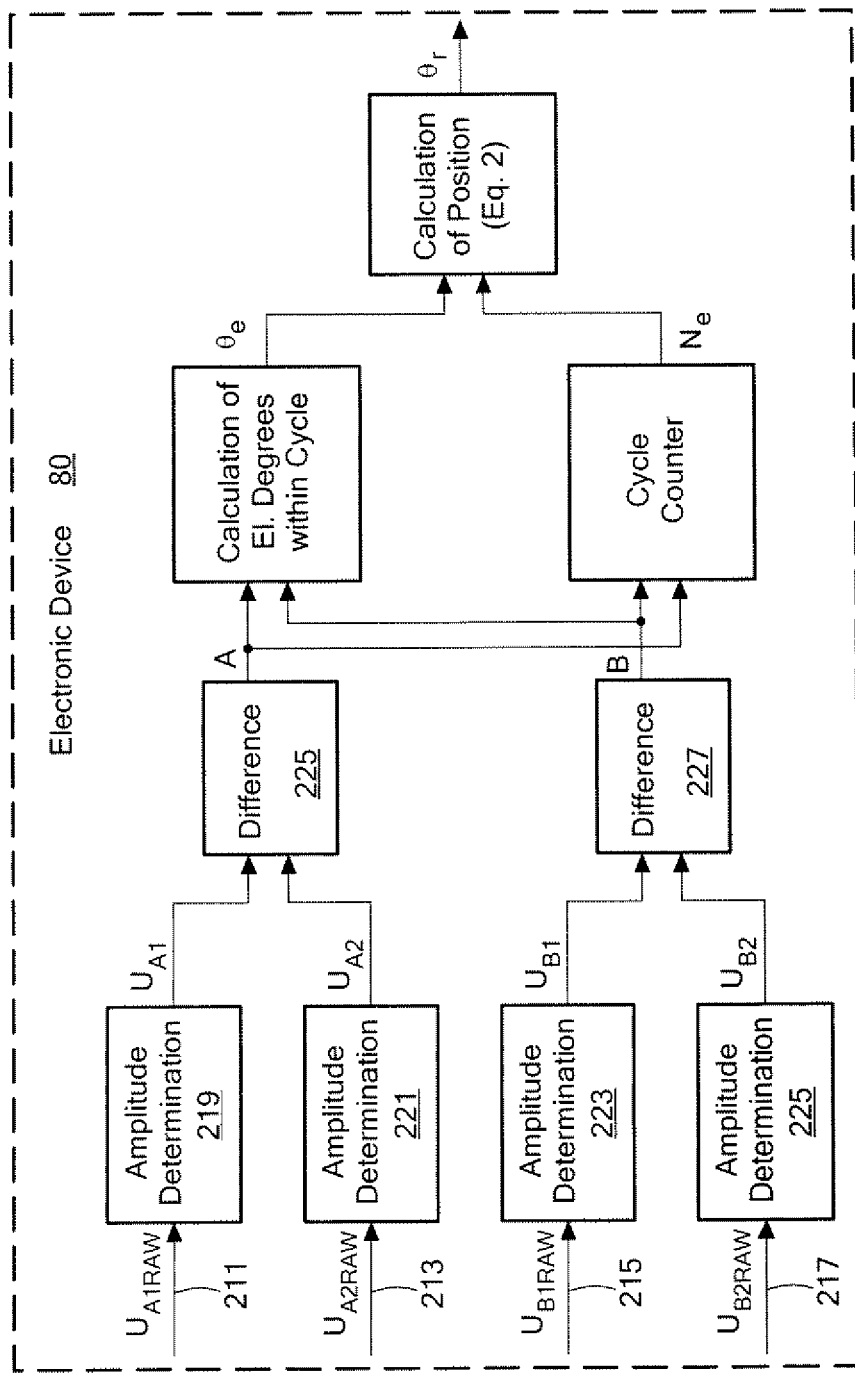
FIG. 5 is a schematic block diagram showing in further detail the primary components and operation of one embodiment of the electronic device shown in FIG. 4.

Device 80, FIGS. 4 and 5, determines the amplitudes of each of the output signals having their amplitudes modulated by the sectors of the incremental track.

For example, as shown in FIG. 5, electronic device 80 receives the signals having their amplitudes modulated by sectors 14 of incremental track 12 from secondary coil 24 of differential read-head 18, UA1RAW, indicated at 211 and shown in plot 212, FIG. 2 and the signals having their amplitudes modulated by sectors 14 of incremental track 12 from secondary coil 26 of differential read-head 18, UA2RAW, indicated at 213 and shown in plot 214, FIG. 2. Similarly, device 80, FIG. 5, receives the signals having their amplitudes modulated by sectors 14 of incremental track 12 from secondary coil 30 of differential read-head 20, UB1RAW, indicated at 215 and shown in plot 218, FIG. 2, and the signals having their amplitudes modulated by sectors 14 of incremental track 12 from secondary coil 32 of differential read-head 20, UB2RAW, indicated at 217, FIG. 5, and shown in plot 214, FIG. 2.

In one example, device 80, FIG. 5, may then determine the amplitudes of the signals having their amplitudes modulated by sectors 14 of incremental track 12, e.g., UA1RAW, UA2RAW, UB1RAW, and UB1RAW, as shown at 219, 221, 223 and 223, respectively. Device 80, FIG. 5 then subtracts the determined amplitudes, e.g., UA1-UA2, shown at 725, and UB1-UB2, shown at 227, to calculate substantially sinusoidal signals and substantially cosine signals, e.g., substantially sinusoidal signals 81, FIG. 2, and substantially cosine signals 82. Device 80, FIGS. 4 and 5, then determines the position of incremental track 12 using the substantially sinusoidal signals and the substantially cosine signals.

Figure 6:
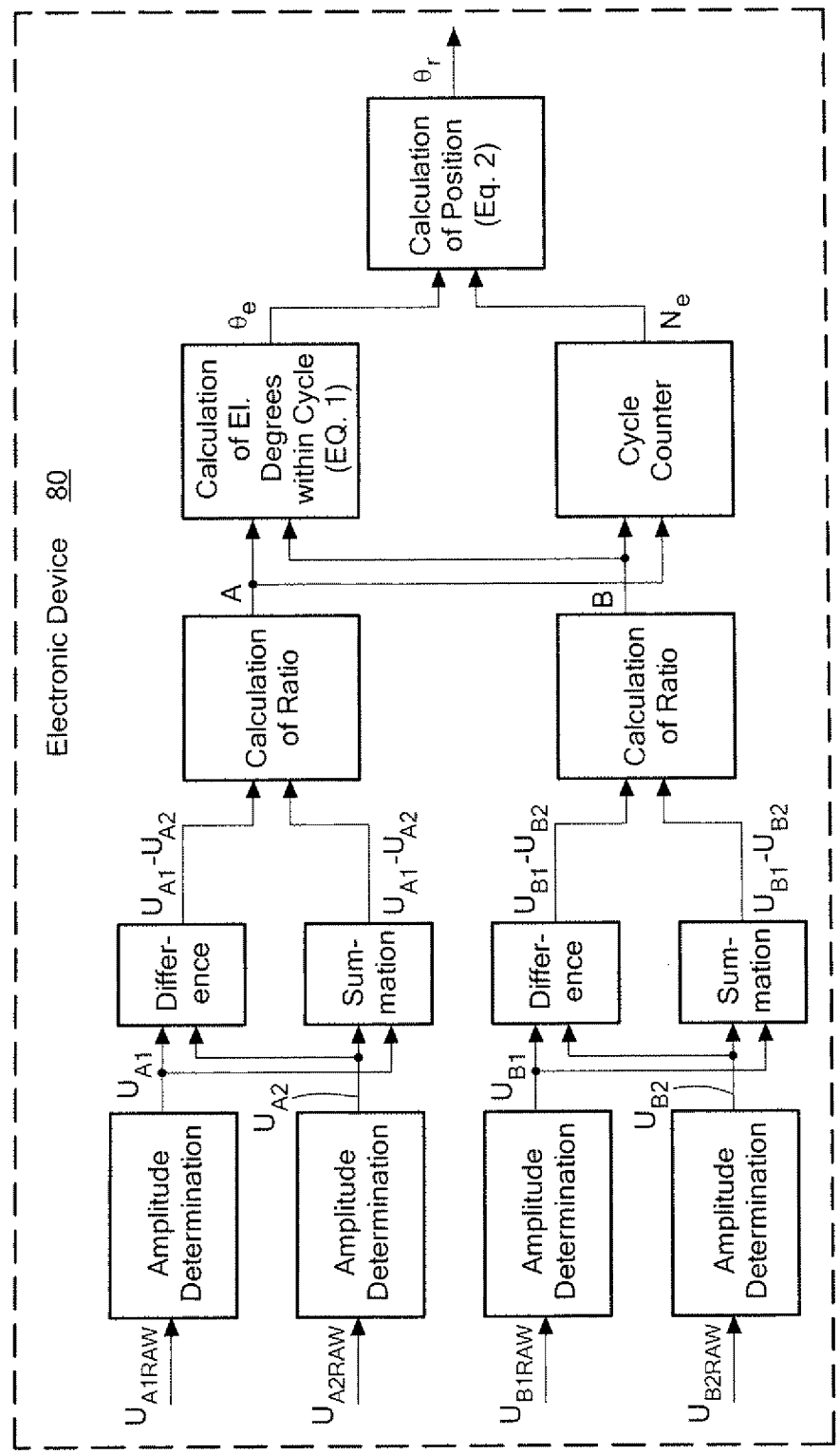
FIG. 6 is a schematic block diagram showing in further detail the primary components and operation of another embodiment of the system and method shown in FIG. 4.
Figure 7:
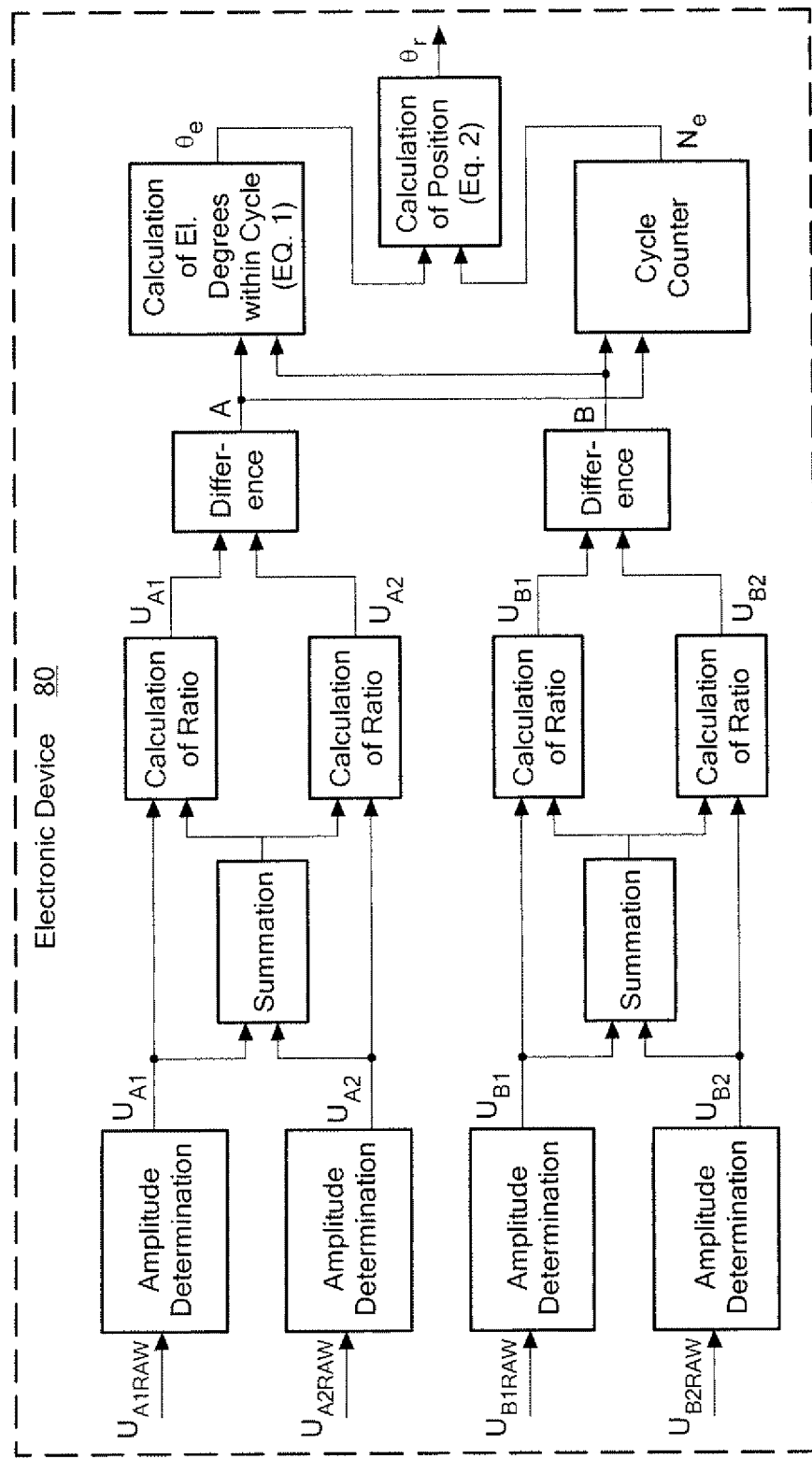
FIG. 7 is a schematic block diagram showing in further detail the primary components and operation of another embodiment of the system and method shown in FIG. 4.

FIGS. 6 and 7 show alternate embodiments for device 80 which may be used to calculate the substantially sinusoidal signals and substantially cosine signals discussed above used by device 80 to determine the position of incremental track 12 using the substantially sinusoidal signals and the substantially cosine signals.

One example of the operation of system 10, FIG. 1, and the method thereof, is discussed below with reference to FIG. 8. In this example, when sector 40 of the track 12 is in a central position with respect to secondary coil 24 (A1) and secondary coil 26 (A2) of differential read-head 18, indicated at 42 on the middle right of FIG. 8, signals of equal amplitudes are induced in secondary coils 24 and 26 resulting in zero output of the differential read-head 18, indicated at 44 on plot 46 in the center of FIG. 8. Such a condition occurs when incremental track 12 is in the initial position of zero electrical degrees.

Figure 8:
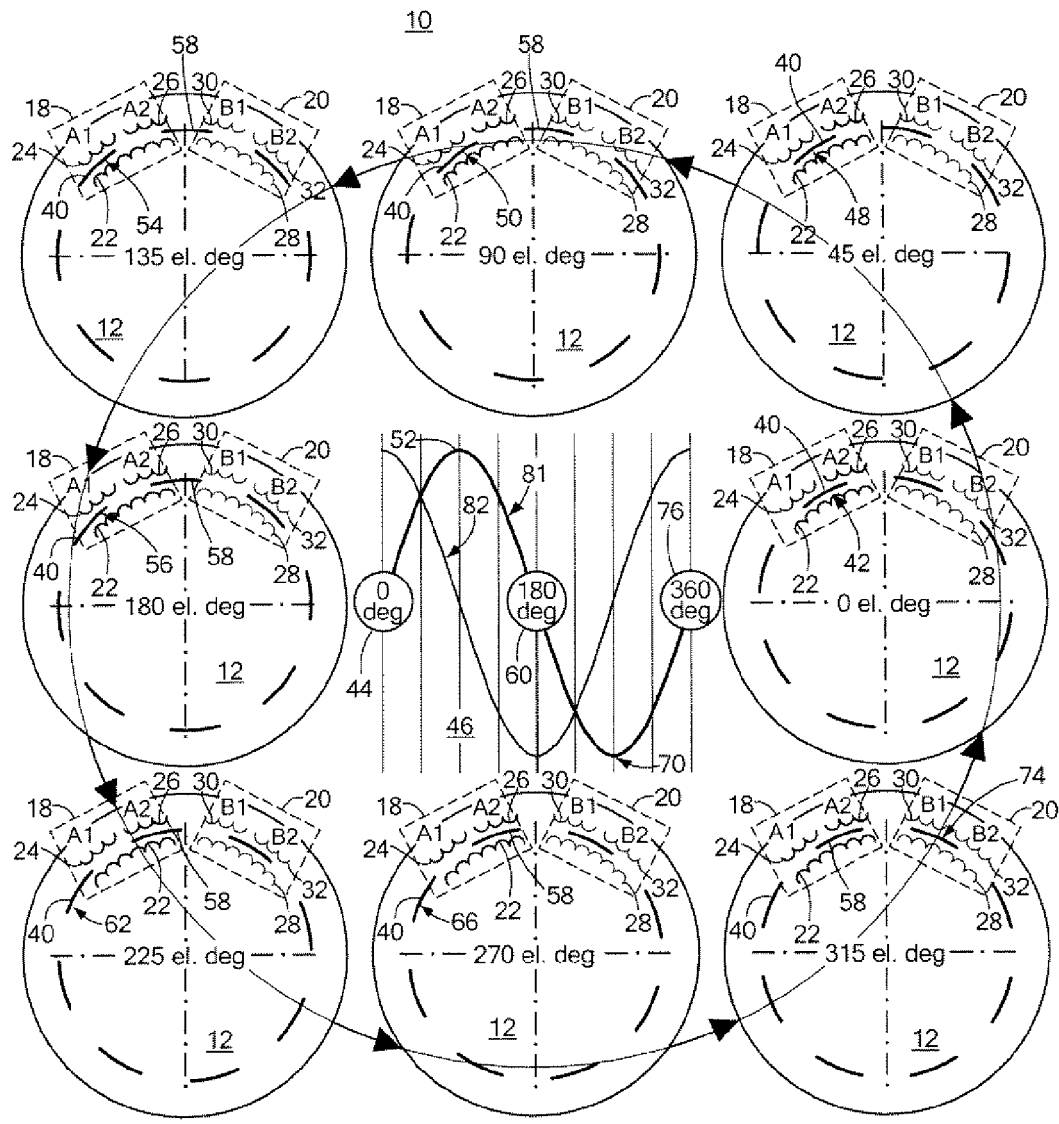
FIG. 8 depicts one example of the operation of the system and method shown in FIG. 1.

As incremental track 12 rotates in the counter-clockwise direction, e.g., as shown at 48, in the upper right of FIG. 8, the amplitude of the signal in secondary coil 24 (A1) increases while the amplitude of the signal in secondary coil 26 (A2) decreases, causing the output amplitude to rise gradually until a maximum is achieved when sector 40 fully overlaps with secondary coil 24 (A1), as shown at 50. The result is output amplitude 52 in plot 46 (90 electrical degrees).

As incremental track 12 continues to rotate counter-clockwise, e.g., as shown at 50 and 54 on the upper middle and left of FIG. 8, the output amplitude gradually reduces as sector 40 leaves secondary coil 24 (A1) and the next sector 58 enters secondary coil 26 (A2). The output amplitude drops back to zero (180 electrical degrees) when the sectors 40 and 58 become symmetric with respect to the center of differential read-head 18, e.g., as shown at 56 and indicated at 60 in plot 46. As track 12 continues to rotate counter-clockwise, e.g., as shown at 62 and 66, in the lower left and middle of FIG. 8, the output amplitude reaches a minimum point (270 electrical degrees), indicated at 70 in plot 46. The output amplitude returns to zero when sector 58 reaches the central position with respect to secondary coils 24 and 26 of differential read-head 18 (the position originally occupied by sector 40), indicated at 76 in plot 46 (360 electrical degrees). The result is differential read-head 18 generates substantially sinusoidal signals 81. See also the discussion above with reference to FIGS. 1-3.

Differential read-head 20, FIGS. 1, 4 and 8 with primary coil 28 and secondary coils 30 and 32 is preferably offset by 90 electrical degrees from differential read-head 18 with primary coil 22 and secondary coils 24 and 26. Differential read-head 20 operates in a similar manner as differential read-head 18 discussed above and generates substantially cosine signals 82, FIGS. 2 and 8. See also the discussion above with reference to FIGS. 1-3.

In one example, the position of incremental track 12 is determined in terms of electrical degrees within one cycle of the output signals using the equation:

$$\theta_c = a \tan 2(A,B) \quad (1)$$

where A and B represent the substantially sinusoidal signals and the substantially cosine signals output by differential read-heads 18 and 20, respectively, and a tan 2 is four quadrant inverse tangent. By counting the number of cycles of the substantially sinusoidal signals and the substantially cosine signals, electronic device 80 can accurately determine the relative r position of incremental track 12 from a start-up point, or from a flag, within a virtually unlimited range of motion using the equation:

$$\theta_r = (2\pi N_c + \theta_e)/N_s \quad (2)$$

where $N_c$ denotes the number of cycles of incremental track 12 (number of cycles of substantially sinusoidal signals 81 and substantially cosine signals 82 counted from the start-up point), and $N_s$ is the number of segments per revolution.

In a ratiometric arrangement e.g., as shown in FIG. 7, the individual signals from secondary coils 24 and 26 of differential read-head 18 and secondary coils 30 and 32 of differential read-head 20 are fed to electronic device 80 and compared to their sum. The resulting ratios are then used to produce (by taking a difference) substantially sinusoidal signals and substantially cosine signals.

In such a differential/ratiometric arrangement, the values of the substantially sinusoidal signals and substantially cosine signals are insensitive to changes in excitation. This may be demonstrated using the following simple calculations:

Assume that U1=K1*AC is amplitude of voltage induced in one secondary coil of a read-head and U2=K2*AC is amplitude of voltage induced in the other secondary coil of the same read-head, where AC is the amplitude of the voltage in the primary coil (excitation), and K1 and K2 are factors that correlate the excitation and induced voltages.

The ratio of the amplitude of the voltage induced in the first winding and the amplitude of the sum can be expressed as:

$$A1 = (K1*AC)/(K1*AC + K2*AC) \quad (3)$$

Similarly, the ratio of the amplitude of the voltage induced in the second winding and the amplitude of the sum may be expressed as:

$$A2 = (K2*AC)/(K1*AC + K2*AC) \quad (4)$$

The difference between A1 and A2 then becomes:

$$A1 - A2 = (K1*AC - K2*AC)/(K1*AC + K2*AC) \quad (5)$$

which simplifies to:

$$A1 - A2 = (K1 - K2)/(K1 + K2) \quad (6)$$

Equation (6) is independent of AC and therefore the result is substantially independent of the amplitude of the excitation which may change due to temperature (temperature may affect the resistance of the primary coil).

Furthermore, assume that the amplitudes of the signals induced in the secondary coils change by a factor of k, e.g., due to temperature effects:

$$U1 = k*K1*AC, U2 = K2*AC. \quad (7)$$

Then:

$$A1 - A2 = (k*K1*AC - k*K2*AC)/(k*K1*AC + k*K2*AC) \quad (8)$$

which simplifies again to:

$$A1 - A2 = (K1 - K2)/(K1 + K2) \quad (9)$$

As a result, system 10 of one or more embodiments is substantially insensitive to environmental affects that result in a proportional changes in the induced signals. The same result may be obtained by interchanging the order of operations performed by electronic device 80 as shown in FIG. 6. Thus, system 10 effectively operates with changes in temperature, pressure, and the like.

In one example, a feedback compensation mechanism may be used to optimize the amplitude and/or the frequency of the excitation signals. The mechanism preferably adjusts the characteristics of the excitation signals based on the sum (as opposed to the difference) of the signals induced in the secondary coils 24 and 26 and secondary coils 30 and 32 of differential read-head 18 and differential read-head 20, respectively, to further improve robustness against changes of physical properties, and minimizing power consumption.

In the set-up phase of system 10, FIGS. 1, 4 and 8, substantially sinusoidal signals 81 and substantially cosine signals 82 may be calibrated by recording their amplitude and phase properties. This information can then be used during operation of system 10 to improve the accuracy and linearity of the position measurements. The same or similar calibration routine can be executed for condition monitoring and/or correction purposes.

In one embodiment, incremental track 12, FIG. 1, may be a ferromagnetic incremental track. In one design, incremental track 12 may have a circular shape as shown in FIGS. 1, 4 and 8.

Figure 9:
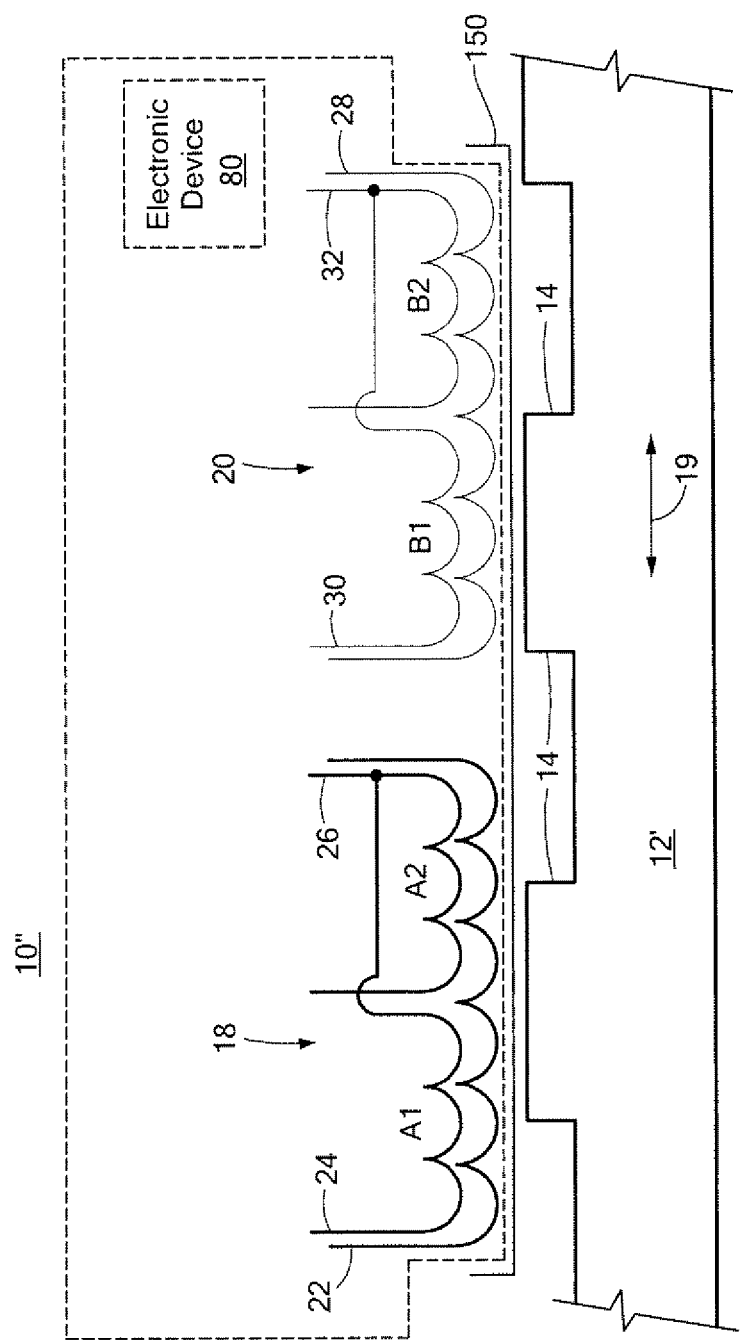
FIG. 9 is a schematic block diagram of another embodiment for the system and method for position sensing of this invention.

In other designs, system 10" for position sensing, FIG. 9, where like parts have been given like numbers, may include incremental track 12' which is linear. In this design, system 10 may operate moving incremental track 12' in a linear direction as shown by arrow 19 with respect to differential read-head 18 and differential read-head 20. Measurement subsystem 22 may then determine the position of incremental track 12' in a similar manner as discussed above. In this example secondary coils 24 and 26 of differential read 18 and secondary coils 30 and 32 of differential read 20 are connected in reverse series. In another example, system 10' for position sensing, FIG. 10, where like parts have been given like numbers, may include incremental track 12' which is linear. In this example, secondary coils 24 and 26 of differential read 18 and secondary coils 30 and 32 of differential read 20 are not connected in reverse series.

Figure 11:
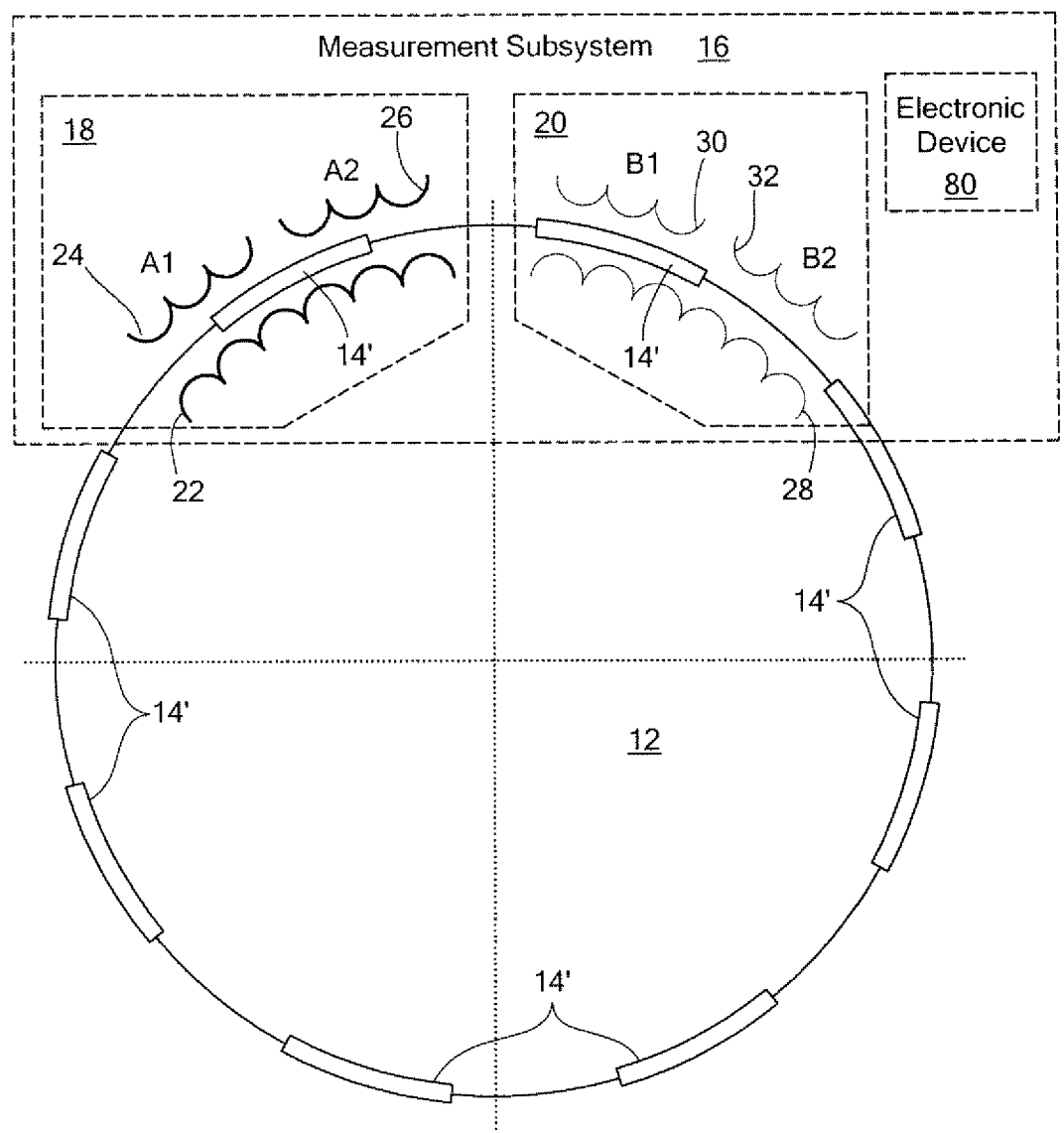
FIG. 11 is a schematic top-view of another embodiment of the incremental track shown in FIGS. 1, 4 and 8.
Figure 12:
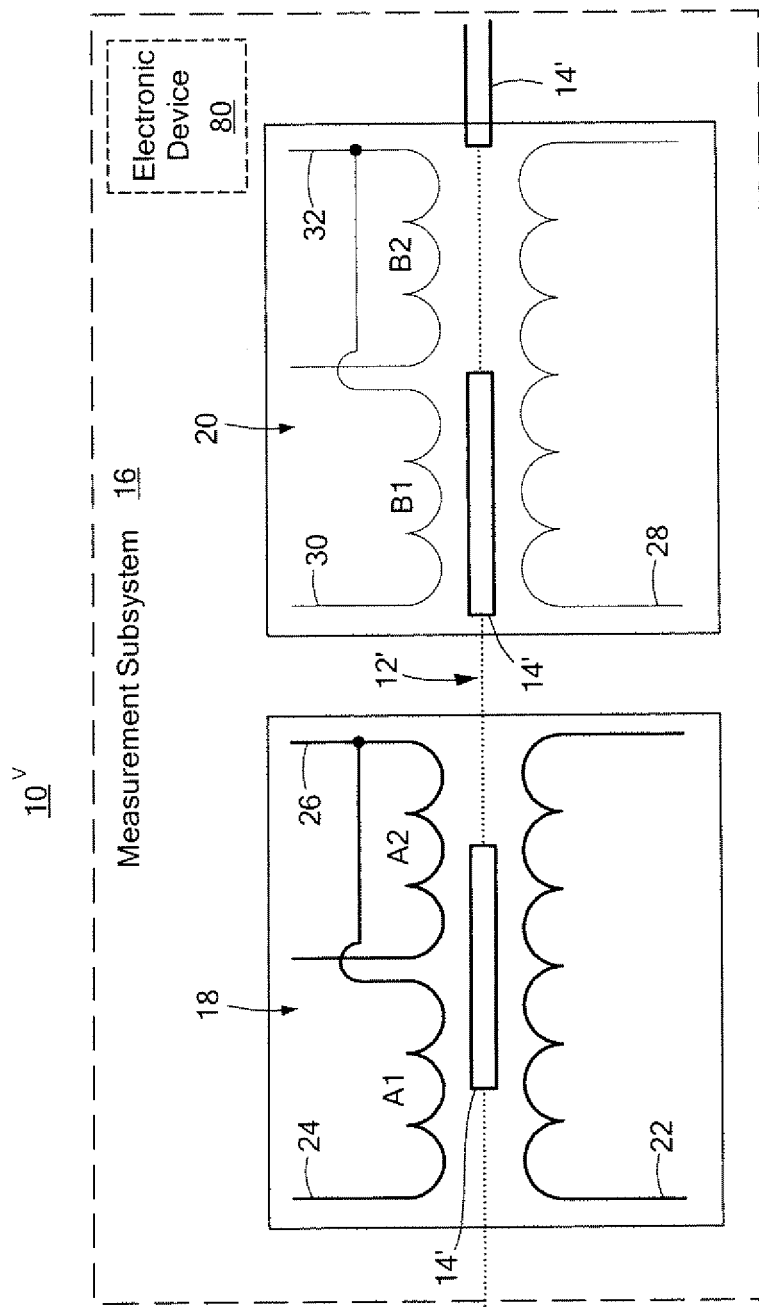
FIG. 12 is a schematic tog-view of another embodiment of the incremental track shown in FIGS. 9 and 10.

In one example, incremental track 12, FIGS. 1, 4 and 8 may be configured such that the sectors are perpendicular to radial axis of track 12, e.g., System $10^{IV}$, FIG. 12, with sectors 14' shown by the top view in FIG. 11. Differential read-head 18 and differential read-head 20 may be either entirely inside or entirely outside of perpendicular sectors 14'. In this example, primary coils 22 and 28 may be on the inside of sectors 14' and secondary coils 24 and 26 and secondary coils 30 and 32 may be on the outside of sectors 14', as shown, the other way around, or any combination thereof.

Figure 10:
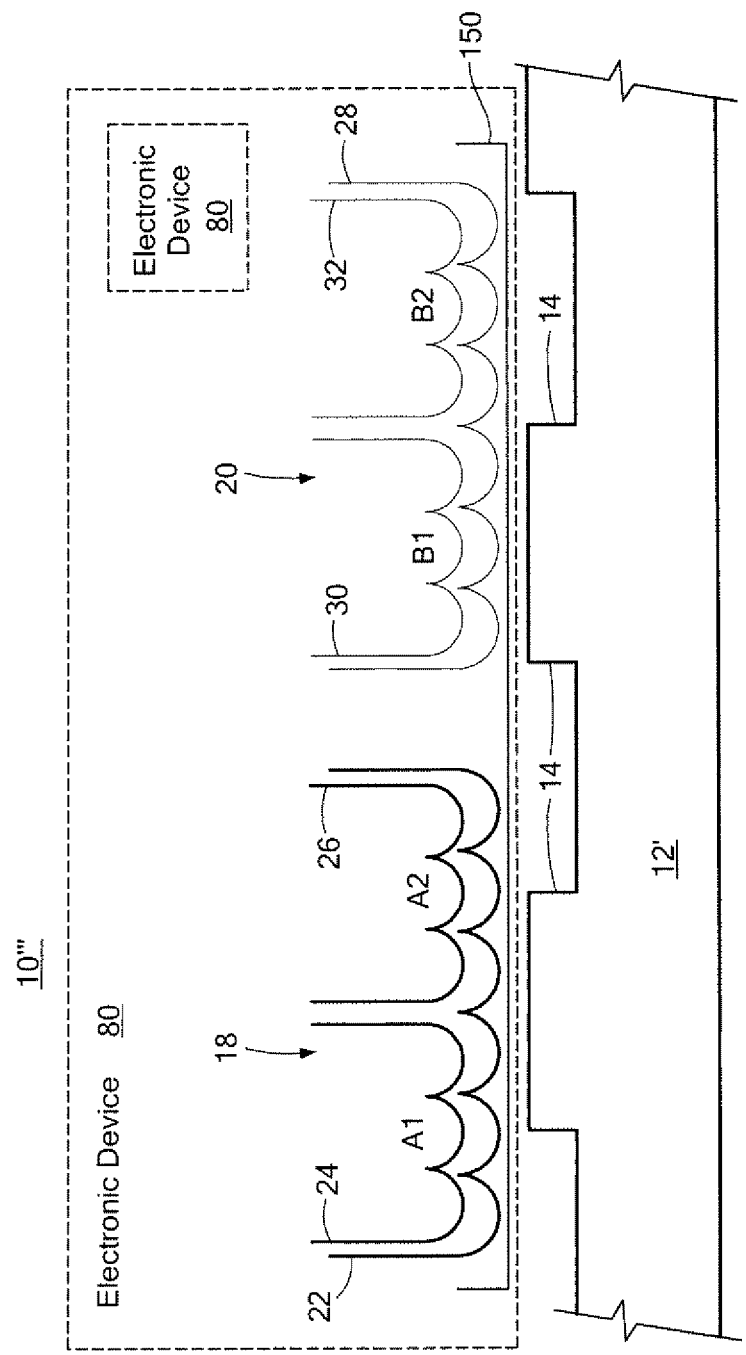
FIG. 10 is a schematic block diagram of another embodiment for the system and method for position sensing of this invention.

System 10", 10''', FIGS. 9 and 10 with linear incremental track 12' and sectors 14' may also include sectors that are perpendicular to incremental track 12', e.g., as shown by system $10^V$, FIG. 12.

Figure 13A:
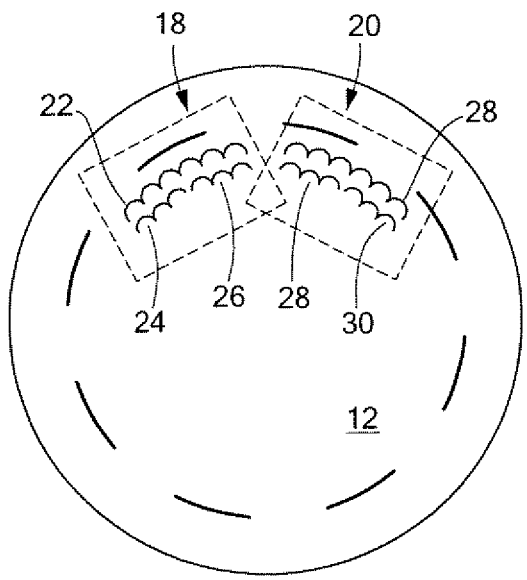
FIGS. 13A-13D depict examples of various locations of the differential read-heads and the primary and secondary coils shown in FIGS. 1, 4, and 8-12.
Figure 13B:
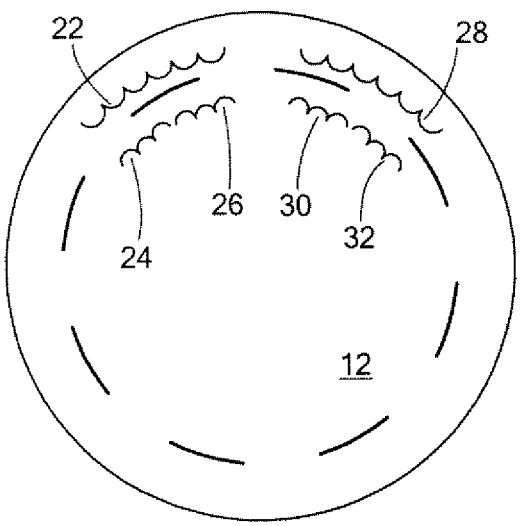
Figure 13C:
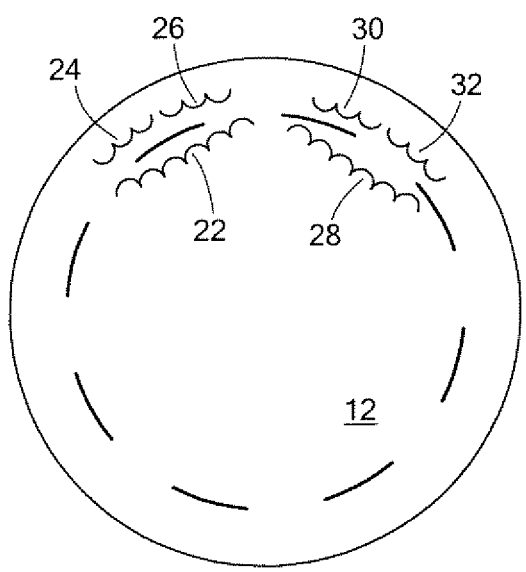
Figure 13D:
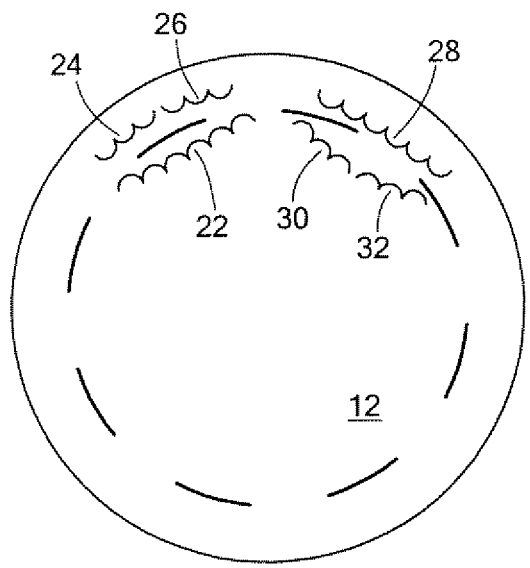

Although as shown in one or more of FIGS. 1, 4, 8, and 11, different read-heads 18 and 20, primary coils 18, 20 and secondary coils 30, 32, respectively, are shown above differential track 12, this is not a necessary limitation of the disclosed embodiment. In other designs, differential read-heads 18 and 20 may be located below incremental track 14, e.g., as shown in FIG. 13A. In other examples, primary coils 22 and 24 may be located above incremental track 12 while secondary coils 24, 26 and 30, 32 may be located below the track, e.g., as shown in FIG. 13B, the other way around, e.g., as shown in FIG. 13C, or any combination thereof, e.g., as shown in FIG. 11D. System 10", 10"', 10$^{IV}$, and 10$^{V}$, FIGS. 9, 10, and 12 may have a similar arrangement of differential read-heads 18 and 20, primary coils 22 and 24 and secondary coils 30 and 32 as shown in one or more of FIGS. 13A-13D.

Incremental track 12, FIGS. 1, 4, and 8-12 may have any other suitable shape known to those skilled in the art and primary coils 22 and 28 and secondary coils 24, 26 and 30, 32 may be arranged in any other suitable configuration known to those skilled in the art. The thickness and/or width of sectors 14 may be larger in the central part of the segment compared to the ends of the sectors. The cross section of sectors 14 may also be non-uniform. The sectors, also referred to as segments, may be made of Fe-rich amorphous material, including Fe-rich amorphous wire. The advantage for this may be a small exciting field. This may result in low power consumption, and a small number of turns in the secondary coils may be used to obtain adequate output signals from the secondary coils.

Incremental track 12, as shown in one or more of FIGS. 1, 4, 8-12 may be hollow with the differential read-head 18 and differential read-head 20 inside, outside, or in any similar arrangement or combination, e.g., as discussed above with reference to FIGS. 13A-13D.

Primary coils 22, 28 and secondary coils 24, 26 and 30, 32 of differential read-head 18 and differential read-head 20, respectively, may be designed as corelles coils, iron-core coils, a pattern on one or more circuit boards, or in any combination of the above known to those skilled in the art.

In a majority of conventional products, multiple tracks on a complex disk or scale may be utilized to hold information for absolute position detection, each track providing the state of one bit of a digital word that represents the corresponding absolute location. Typically, a Gray-type code may be utilized to ensure that only single-bit transitions occur as the disk or scale moves.

Figure 14:
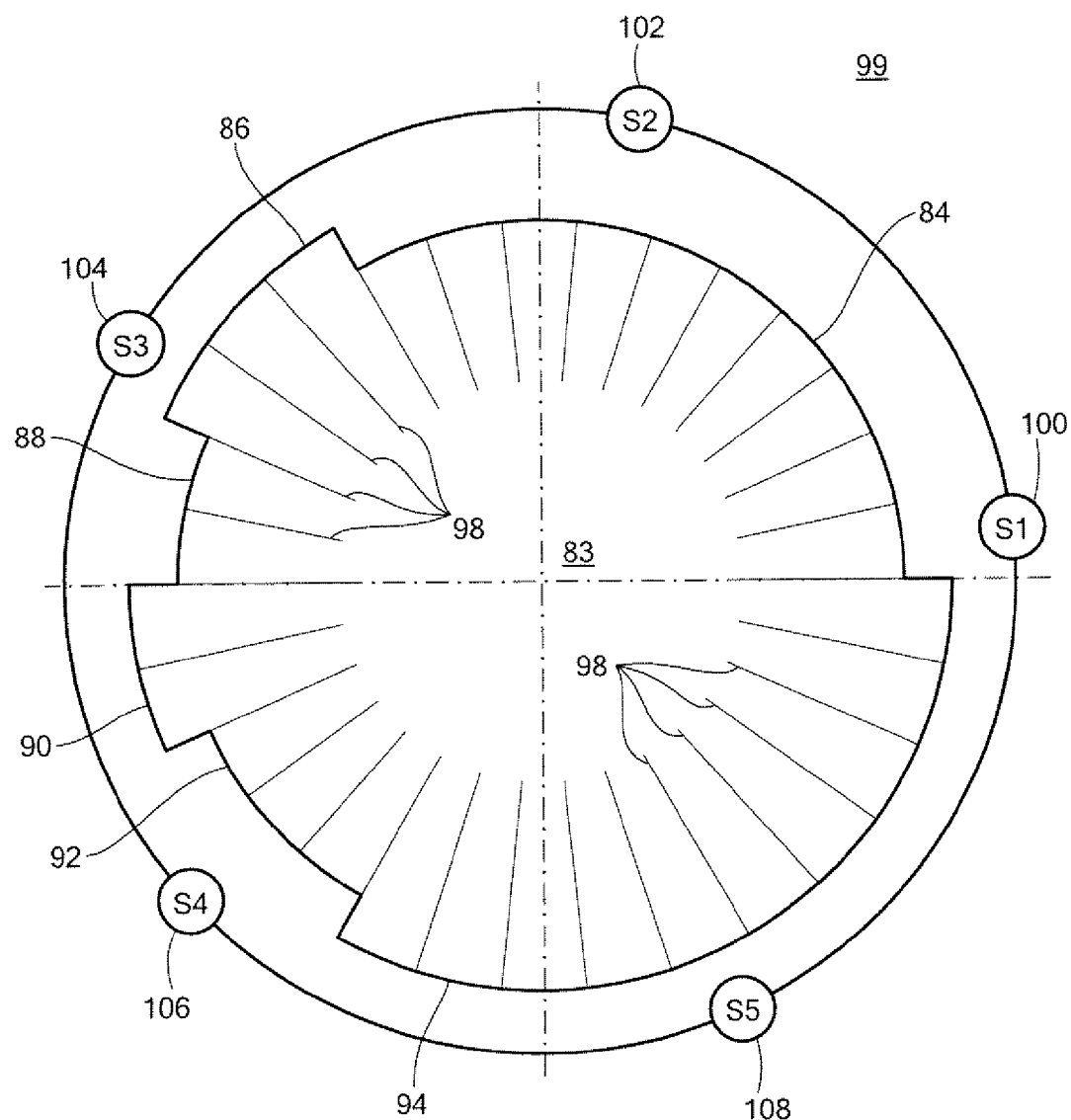
FIG. 14 is a schematic diagram showing one embodiment of an absolute position measurement subsystem of this invention.

In contrast, system 10, FIGS. 1 and 3-12 may include absolute position measurement subsystem 99, FIG. 14, configured to determine the start position of an object. Absolute position measurement subsystem 99 preferably includes absolute track 83 having plurality of non-uniform sections, e.g., sections 84, 86, 88, 90, 92 and 94. Absolute position measurement subsystem 99 may also include a plurality of sensors, e.g., sensors 100, 102, 104, 106 and 108 configured to determine which of sections 84-94 are interacting with sensors 100-108 to determine the location of an object, e.g., the position of absolute track 83. In one example, sensors 100-108 may be inductive sensors, although this is not a necessary limitation of this invention, as other type of sensors may be used as known by those skilled in the art. For illustrative purposes, FIG. 14 also shows a predetermined number of subdivisions on absolute track 83, exemplified at 98. In this example, absolute track 83 includes 30 subdivisions. The subdivisions are not physically on absolute track 83, they are show for illustrative purposes only, as discussed below.

In operation, absolute position measurement subsystem 99 determines the start position of absolute track 83 by detecting transitions of non-uniform sections 84-94. Absolute position measurement subsystem 99 is configured such that only one of sensors 100-108 detects a transition of non-uniform sectors 84-94 at a single time.

For example, whenever absolute track 83 moves with respect to sensors 100-108 by one of subdivisions 98, one of sensors 100-108 changes state. As the state of one of sensors 100-108 changes, pattern 120, FIG. 15, may be formed from the states of all of sensors 100-108 also changes. Pattern 120 shows one example of all of the possible state combinations. Using pattern 120, absolute position measurement subsystem 99, FIG. 14, determines the start position of absolute track 83 with respect to sensors 100-108, as shown in columns 122, FIG. 15. Therefore, in this example, there are 30 unique positions per revolution that the absolute position measurement subsystem 99, FIG. 14, can read, each represented by a unique pattern of sensor states. In this example, absolute position measurement subsystem 99 can uniquely determine absolute position with resolution of 1/30 of a revolution. Incremental track 12, e.g., as shown in one or more of FIGS. 1, 4, and 8-12 may be coupled to absolute track 83. Thus, if the start position of absolute track 83 is known, the position of incremental track 12 is also known. Therefore, in this particular example, absolute position measurement subsystem 99 can be used with incremental tract 12 having up to 30 uniform segments. Preferably the number of uniform segments 14 of incremental track 12 is the same as the number of unique patterns of the absolute position measurement system 99 as the highest overall resolution is achieved. Typically, absolute position measurement subsystem 99 is used to determine the absolute position on start-up, and then verify it periodically and/or on-demand during operation.

When compared to a majority of conventional encoder technologies, including optical solutions, uniform sectors 14 of incremental track 12 discussed above with reference to one or more of FIGS. 1-14, can be relatively large. For example, it was demonstrated that a differential transformer with a single moving core can achieve accuracy of about 1 micrometer over a 14-mm range of motion. This may suggest a position resolution of more than 18 bits/revolution may be possible with just 30 uniform sectors 14 of incremental track 12. A large feature size may be desirable for robustness against contamination and resistance to abrasion.

Preferably, the total number of bits sensed by the absolute position measurement subsystem 99 may be lower than in a majority of existing absolute encoders. This is because the incremental track 12 with uniform sectors 14 may be relatively coarse, which considerably relaxes the required resolution of absolute position detection. A lower number of absolute position sensors translates to reduced complexity, and is desirable from the reliability perspective.

In other embodiments, alternative absolute position mechanisms may be used with the incremental position measurements. In addition to the single-track absolute position mechanism discussed above with reference to FIG. 14, incremental track 12, FIGS. 1, 4, and 8-12 may be complemented by other know methods for obtaining an absolute position reference point, including without limitation battery backup, limit switches, distance-coded absolute position patterns, multi-track absolute position patterns or wiegand effect counter. Any suitable sensing methods may be used for this purpose, including inductive and optical as applicable.

In one design, system 10, FIGS. 1, 4, and 8-12, preferably includes a barrier between incremental track 12 measurement subsystem 12, e.g., barrier 150 shown in FIGS. 1, 9 and 10. Barrier 150 preferably isolates measurement subsystem 20 and/or differential read-heads 18 and 20 from the external environment and protects them from abrasive dust and aggressive agents. In industrial applications, the moving components associated with incremental track 12 may be in vacuum, subject to aggressive agents or subject to other harsh conditions while measurement subsystem 16 may be located outside in a controlled environment. In order to limit interference with the magnetic field and eddy-current losses, barrier 150 is preferably made of a non-ferromagnetic material with a relatively high resistivity, e.g., 300-series stainless steel or similar type materials known to those skilled in the art.

Measurement subsystem 16 may also be fully encapsulated outside of barrier 150. In one example, the combination of barrier 150 and a coarse ferromagnetic incremental track 12 made of a highly resistant material (e.g., magnetically soft metal) provides system with a high level of reliability and tolerance to abrasive dust and aggressive agents. Additionally, out-gassing issues in the moving section of system 10 are virtually non-existent.

In addition to real-time incremental position measurement capability of absolute position measurement subsystem 99, FIG. 14, system 10 may include an additional arrangement for absolute position detection which allows the electronic device 80 to identify uniquely which of the plurality of sectors 14, FIGS. 1, 4, 8-12 of incremental track 12 is currently interacting with differential read-head 18 and differential read-head 20.

In order to further simplify the system 10, particularly rotating incremental track 12, which is often subject to the most severe conditions, it may be possible to combine incremental track 12 and absolute track 83 into a single-track solution. In this example, a properly designed absolute track is used with multiple differential-transformer read-heads which are utilized to obtain both coarse absolute position readings and fine relative position measurements.

In one design, system 10, shown in one or more of FIGS. 1-12, may have a combination of incremental track 12 with differential read-heads 18 and 20 and absolute track 83 with another set of differential read-heads having a similar design to differential read-heads 18 and 20 as discussed above.

Measurement subsystem 16 may be implemented on a single compact printed circuit board assembly. In many applications, incremental track 12 and absolute track 83 can be incorporated directly into an existing part, further reducing the complexity, cost and weight of the solution.

In addition to feedback control of the excitation signals discussed above, electronic device 80, FIGS. 1, 3-7, and 9-12 may provide several condition-monitoring features. The outputs of differential read-head 18 and differential read-head 20 may be monitored in real time. This allows for detection of gradual signal deterioration as well as prompt response to fatal problems, such as shorts and disconnects. Similarly, the absolute position detection capability of absolute position measurement 99, FIG. 14, may be used to periodically compare position measurements obtained from incremental track 12, FIGS. 1, 4, and 8-12 and absolute track 83, FIG. 14, and utilize the resulting information for condition-monitoring and self-correction purposes. When integrated with system 10, such condition-monitoring may be implemented for fail-safe behavior of system 10.

Figure 16:
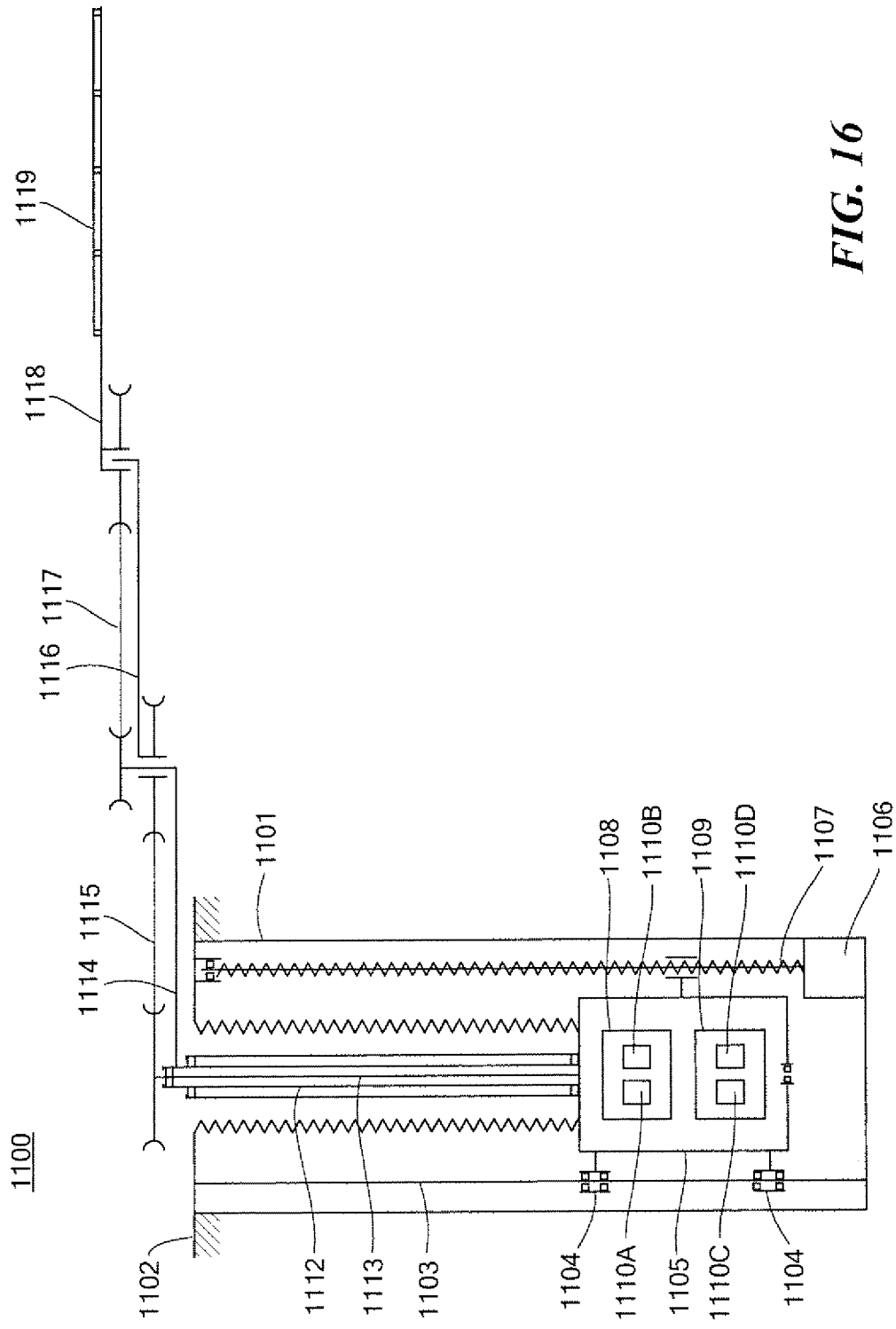
FIG. 16 is a schematic diagram showing one embodiment of a robotic manipulator incorporating the system for position sensing of the disclosed embodiment.

One example of robotic manipulator 1100, FIG. 16, incorporating one or more embodiments of system 10 shown in one or more of FIGS. 1-14, may be built around frame 1101, FIG. 16, suspended from mounting arrangement 1102. Alternatively, the mounting arrangement may be on the side of frame 1101, at the bottom of frame 1101 or frame 1101 may be mounted in any other suitable manner. Frame 1101 may incorporate one or more vertical rails 1103 with linear bearings 1104 to provide guidance to motor housing 1105 driven by motor 1106 via ball-screw mechanism 1107. Only one rail 1103 is shown for simplicity. Alternatively, motor housing 1105 may be driven by a linear motor, attached directly to frame 1101 or coupled to frame 1101 in any other suitable movable or unmovable manner. Motor housing 1105 may house multiple motors, e.g., motors 1108, 1109, which may be equipped with position encoders, e.g., position encoders 1110A, 1110B and 1111A, 1111B, where 1110A and 1111A, may represent incremental encoders with incremental and/or absolute tracks and 1110B and 1111B may represent absolute position measurement subsystems as discussed above with reference to one or more of FIGS. 1-15. A separation barrier may be utilized to allow the motor rotors and encoder incremental and/or absolute tracks to be in one type of environment, e.g., vacuum, and the motor stators and encoder measurement subsystems to be in another environment, e.g., the atmosphere. In the example shown in FIG. 16 two motors and 4 encoders are shown. However, any suitable number of motors and encoders may be used.

In one example, upper motor 1108 may drive hollow outer shaft 1112 connected to first link 1114 of the robot arm. Lower motor 1109 may be connected to coaxial inner shaft 1113 which may be coupled via belt drive 1115 to second link 1116. Another belt arrangement 1117 may be employed to maintain radial orientation of third link 1118 regardless of the position of the first two links 1114 and 1116. This may be achieved due to a 1:2 ratio between the pulley incorporated into the first link and the pulley connected to the third link. Third link 1118 may form an end-effector that may carry payload 1119, for instance, a semiconductor substrate. The robotic arm shown in FIG. 16 is for exemplary purposes only and is not a necessary limitation of the disclosed embodiments. Any other suitable arm mechanism may be used.

Figure 17:
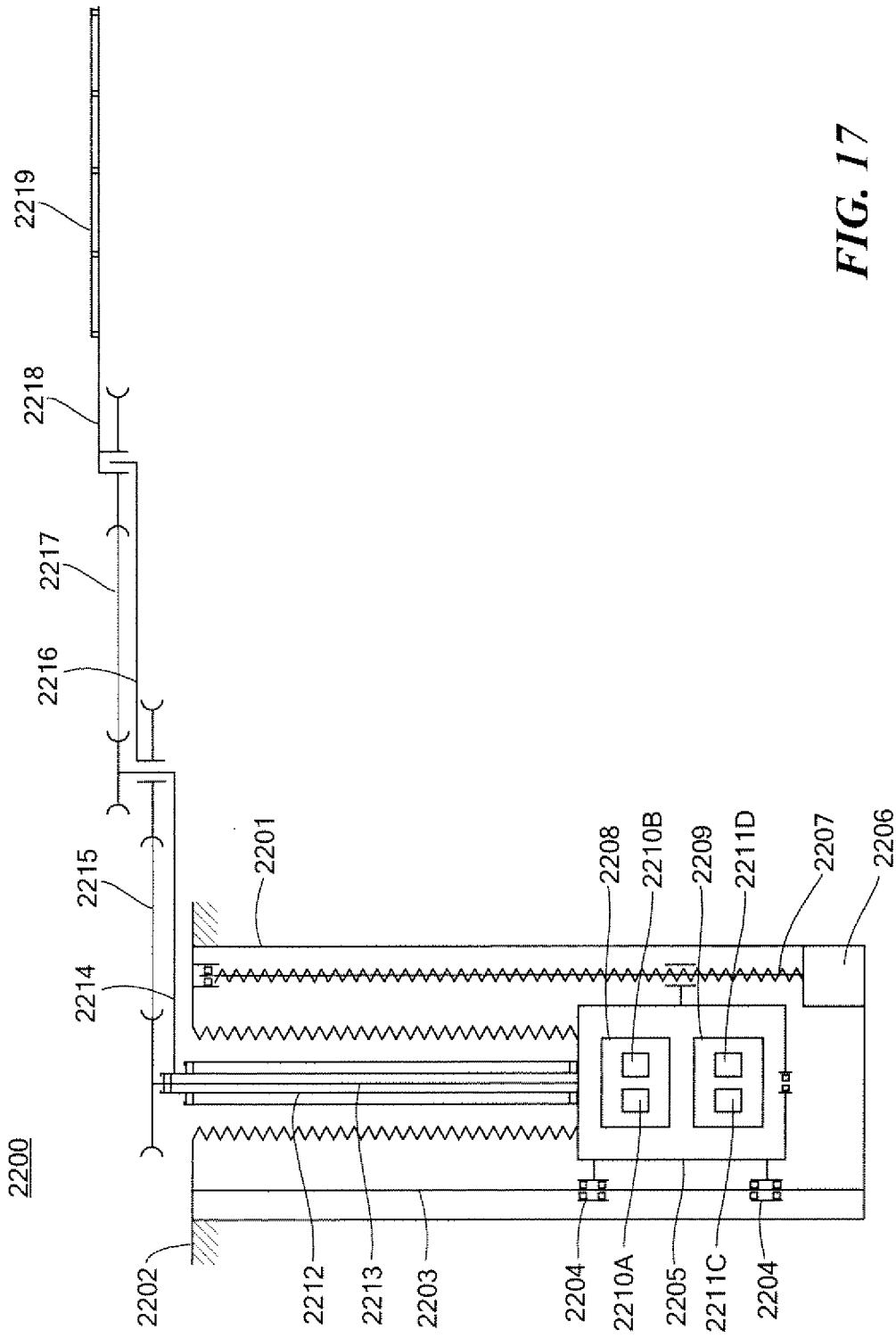
FIG. 17 is a schematic diagram showing another embodiment of a robotic manipulator incorporating the system for position sensing of the disclosed embodiment.

Another example of a robotic manipulator 2200, FIG. 17, incorporating one or more embodiments of system 10, FIGS. 1-12, may be built around frame 2201, FIG. 17, suspended from mounting arrangement 2202. Alternatively, the mounting arrangement may be on the side of frame 2201 at the bottom of frame 2201 or frame 2201 may be mounted in any other suitable manner. Frame 2201 may incorporate one or more vertical rails 2203 with linear bearings 2204 to provide guidance to motor housing 2205 driven by motor 2206 via ball-screw mechanism 2207. Only one rail 2203 is shown for simplicity. Alternatively, motor housing 2205 may be driven by a linear motor, attached directly to frame 2201 or coupled to frame 2201 in any other suitable movable or unmovable manner. Motor housing 2205 may house motors 2208, 2209 equipped with position encoders 2210A, 2210B and 2211A, 2211B, where 2210A and 2211A may represent incremental encoders with incremental and/or absolute tracks, and 2210B and 2211B may represent absolute position measurement subsystems as discussed above with reference to one or more of FIGS. 1-12. In this example, no separation barrier is used. Although as shown in FIG. 17 two motors and encoders are shown, any suitable number of motors and encoders may be used.

Upper motor 2208 may drive hollow outer shaft 2212 connected to first link 2214 of the robot arm. Lower motor 2209 may be connected to coaxial inner shaft 2213 which may be coupled via belt drive 2215 to second link 2216. Another belt arrangement 2217 may be employed to maintain radial orientation of third link 2218 regardless of the position of the first two links 2214 and 2216. This may be achieved due to a 1:2 ratio between the pulley incorporated into the first link and the pulley connected to the third link. Third link 2218 may form an end-effector that may carry payload 2219, for instance, a semiconductor substrate. The robotic arm shown in FIG. 17 is shown for exemplary purposes only and is not a necessary limitation of this invention. Any other suitable arm mechanism may be used.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A system for position sensing comprising:
   an incremental track including a plurality of sectors;
   a measurement subsystem including:
   at least two differential read-heads each having at least one primary coil and at least two differential secondary coils, the at least two differential secondary coils of one of the at least two differential read-heads configured to generate output signals having their amplitudes modulated by the sectors of the incremental track and the at least two differential secondary coils of the other of said two differential read-heads configured to generate output signals having their amplitudes modulated by the sectors of the incremental track;
   a device configured to independently determine the amplitude of each read head secondary coil output signal to determine the position of the track, determine substantially sinusoidal signals and substantially cosine signals with respect to a position of the sectors of the incremental track, and determine the position of the track using the substantially sinusoidal signals and the substantially cosine signals; and
   an absolute track having a pattern of non-uniform sections, the absolute track coupled to the incremental track, and a plurality of sensors configured to determine the position by detecting transitions of the non-uniform sections.

2. The system of claim 1 in which the device is configured to determine the angular position of the track independent of the amplitudes of the output signals.

3. The system of claim 1 in which said differential read-heads are configured to determine the position irrespective of a change in a predetermined condition.

4. The system of claim 1 further including a barrier between the incremental track and the measurement subsystem, the barrier configured to isolate said measurement subsystem from an external environment.

5. A system for position sensing comprising:
   an incremental track including a plurality of sectors;
   a measurement subsystem including:
   at least two differential read-heads each having at least one primary coil and at least two secondary coils, the at least two secondary coils of one of the at least two differential read-heads configured to generate output signals having substantially sinusoidal signed amplitudes based on a differential measurement between the secondary coils with respect to a position of the incremental track and the at least two secondary coils of the other of said two differential read-heads configured to generate output signals having substantially cosine signed amplitudes based on a differential measurement between the secondary coils with respect to the position of the track
   a device configured to independently determine the amplitude of each read head secondary coil output signal to determine the position of the track; and
   an absolute track having a pattern of non-uniform sections, the absolute track coupled to the incremental track and a plurality of sensors configured to determine the position by detecting transitions of the non-uniform sections.

6. The system of claim 5 in which the device is configured to determine the angular position of the track independent of the amplitudes of the output signals having substantially sinusoidal signed amplitudes and the output signals having substantially cosine signed amplitudes.

7. The system of claim 5 in which said differential read-heads are configured to determine the position irrespective of a change in a predetermined condition.

8. The system of claim 5 further including a barrier between the incremental track and the measurement subsystem, the barrier configured to isolate said measurement subsystem from an external environment.

9. A method for position sensing, the method comprising:
   providing an incremental track including a plurality of sectors;
   providing at least two differential read-heads, each having at least one primary coil and at least two differential secondary coils;
   generating output signals having their amplitudes modulated by the sectors of the incremental track by the at least two differential secondary coils of one of the at least two differential read-heads;
   generating output signals having their amplitudes modulated by the sectors of the incremental track by the other of said two differential read-heads;
   determining the position of the track by independently determining the amplitude of the output of each secondary coil of the read-heads including determining substantially sinusoidal signals and substantially cosine signals with respect to a position of the sectors of the incremental track and determining the position of the track using the substantially sinusoidal signals and the substantially cosine signals; and determining the position by detecting transitions of non-uniform sections of an absolute track coupled to the incremental track.

10. The system of claim 1 in which the differential secondary coils of each read head are connected.

11. The system of claim 1 in which the differential secondary coils of each read head are not connected.

12. The system of claim 5 in which the differential secondary coils of each read head are connected.

13. The system of claim 5 in which the differential secondary coils of each read head are not connected.

* * * * *